United States Patent
Cordero et al.

(10) Patent No.: US 10,229,043 B2
(45) Date of Patent: Mar. 12, 2019

(54) REQUESTING MEMORY SPACES AND RESOURCES USING A MEMORY CONTROLLER

(71) Applicant: International Business Machines Corporation, Armonk, NY (US)

(72) Inventors: Edgar R. Cordero, Round Rock, TX (US); Varkey K. Varghese, Bangalore (IN); Diyanesh B. Vidyapoornachary, Bangalore (IN)

(73) Assignee: Intel Business Machines Corporation, Armonk, NY (US)

( * ) Notice: Subject to any disclaimer, the term of this patent is extended or adjusted under 35 U.S.C. 154(b) by 164 days.

(21) Appl. No.: 13/948,290

(22) Filed: Jul. 23, 2013

(65) Prior Publication Data

US 2015/0033002 A1   Jan. 29, 2015

(51) Int. Cl.
*G06F 9/50*    (2006.01)
*G06F 12/02*    (2006.01)
(Continued)

(52) U.S. Cl.
CPC .......... *G06F 12/023* (2013.01); *G06F 9/4401* (2013.01); *G06F 9/45558* (2013.01);
(Continued)

(58) Field of Classification Search
CPC .. G06F 9/45533; G06F 9/4881; G06F 9/4403; G06F 13/4239; G06F 9/5016;
(Continued)

(56) References Cited

U.S. PATENT DOCUMENTS

| | | |
|---|---|---|
| 5,263,161 A | 11/1993 | Barth et al. |
| 5,784,698 A | 7/1998 | Brady et al. |

(Continued)

FOREIGN PATENT DOCUMENTS

| | | |
|---|---|---|
| EP | 0213832 A2 | 3/1987 |
| EP | 1965304 | 9/2008 |
| JP | 05-120039 | 5/1993 |
| JP | 2002149697 A | 5/2002 |
| WO | 02080026 A1 | 10/2002 |

OTHER PUBLICATIONS

"MCP-2A Version 3.21". Kenwood. Jul. 31, 2012. p. 1.*
(Continued)

*Primary Examiner* — Lewis A Bullock, Jr.
*Assistant Examiner* — Gilles R Kepnang
(74) *Attorney, Agent, or Firm* — Patterson + Sheridan, LLP

(57) ABSTRACT

Methods of requesting memory spaces and resources using a memory controller are provided. A particular method may include communicating, by a memory controller, a request to a computer program for a resource, and using the resource in response to an indication from the computer program that the resource is available. Another particular method may include communicating a request to a memory controller for at least one of a memory space of a memory or a second resource. The memory controller may be configured to communicate the request from the first resource to a computer program. Another particular method may also include using, by the first resource, at least one of the memory space or the second resource in response to an indication that the memory space or the second resource is available.

19 Claims, 10 Drawing Sheets

(51) Int. Cl.
*G06F 9/4401* (2018.01)
*G06F 9/455* (2018.01)
*G06F 13/24* (2006.01)
*G06F 12/08* (2016.01)
*G06F 11/07* (2006.01)

(52) U.S. Cl.
CPC .......... *G06F 9/5016* (2013.01); *G06F 11/073* (2013.01); *G06F 12/08* (2013.01); *G06F 13/24* (2013.01); *G06F 2009/45579* (2013.01); *G06F 2212/1044* (2013.01)

(58) Field of Classification Search
CPC .. G06F 9/5011; G06F 11/3409; G06F 9/3836; G06F 9/5077; G06F 9/4411; G06F 9/45537; G06F 13/24; G06F 13/32; G06T 1/20
USPC .......................... 710/113; 711/170; 718/105
See application file for complete search history.

(56) References Cited

U.S. PATENT DOCUMENTS

| | | | |
|---|---|---|---|
| 6,112,045 A | 8/2000 | Hauman | |
| 6,119,214 A | 9/2000 | Dirks | |
| 6,161,153 A | 12/2000 | Porterfield et al. | |
| 6,412,045 B1 | 6/2002 | DeKoning et al. | |
| 6,437,789 B1 | 8/2002 | Tidwell et al. | |
| 6,542,957 B2 | 4/2003 | Miura et al. | |
| 6,985,937 B1 | 1/2006 | Keshav et al. | |
| 7,023,445 B1 | 4/2006 | Sell | |
| 7,035,989 B1 | 4/2006 | Hinker et al. | |
| 7,636,819 B2 | 12/2009 | Alsup | |
| 7,934,070 B2 | 4/2011 | Brittain et al. | |
| 8,006,064 B2 | 8/2011 | Li et al. | |
| 8,074,049 B2 | 12/2011 | Gelson et al. | |
| 8,230,431 B2 | 7/2012 | Harris | |
| 8,341,269 B2 | 12/2012 | Balani et al. | |
| 8,418,185 B2 | 4/2013 | Durham et al. | |
| 8,443,161 B2 | 5/2013 | Cho et al. | |
| 8,554,747 B2 | 10/2013 | Barsness et al. | |
| 8,601,221 B2 | 12/2013 | Chirca et al. | |
| 8,645,965 B2 * | 2/2014 | Zimmer | G06F 9/5077 712/13 |
| 8,713,279 B2 | 4/2014 | Komikado et al. | |
| 9,229,854 B1 * | 1/2016 | Kuzmin | G06F 12/0246 |
| 9,235,435 B2 * | 1/2016 | Oshins | G06F 9/45537 |
| 9,558,025 B2 * | 1/2017 | Wang | G06F 9/45558 |
| 9,563,588 B1 * | 2/2017 | Marty | G06F 13/32 |
| 2003/0208650 A1 * | 11/2003 | Depew | G06F 11/1658 710/302 |
| 2004/0168005 A1 * | 8/2004 | Civlin | G06F 11/3409 710/260 |
| 2004/0193783 A1 * | 9/2004 | Sharma | G06F 9/4411 711/104 |
| 2005/0010723 A1 | 1/2005 | Cho et al. | |
| 2005/0125580 A1 * | 6/2005 | Madukkarumukumana | G06F 9/45533 710/200 |
| 2006/0265553 A1 * | 11/2006 | Arimilli et al. | 711/144 |
| 2008/0072027 A1 * | 3/2008 | Zimmer | G06F 9/4403 713/1 |
| 2008/0115137 A1 * | 5/2008 | Gower | G06F 13/4239 718/102 |
| 2008/0235436 A1 * | 9/2008 | Zimmer | G06F 9/4403 711/103 |
| 2008/0244229 A1 * | 10/2008 | Yao | G06F 9/3836 712/205 |
| 2008/0271054 A1 | 10/2008 | Allison et al. | |
| 2008/0309676 A1 | 12/2008 | Nehab et al. | |
| 2009/0089788 A1 | 4/2009 | Turner | |
| 2009/0138887 A1 * | 5/2009 | Uehara | G06F 9/5077 718/104 |
| 2009/0172690 A1 * | 7/2009 | Zimmer | G06F 9/5077 718/104 |
| 2009/0193232 A1 | 7/2009 | Watanabe | |
| 2009/0217273 A1 * | 8/2009 | Mutlu | G06F 9/4881 718/101 |
| 2009/0217280 A1 | 8/2009 | Miller et al. | |
| 2009/0307377 A1 * | 12/2009 | Anderson | G06F 9/5016 710/3 |
| 2009/0327576 A1 * | 12/2009 | Oshins | G06F 9/45533 711/6 |
| 2010/0115330 A1 | 5/2010 | Khatri et al. | |
| 2010/0191918 A1 | 7/2010 | Lee et al. | |
| 2010/0191929 A1 * | 7/2010 | Rawson, III | 711/170 |
| 2010/0205395 A1 * | 8/2010 | Srinivasan | G06F 9/45558 711/170 |
| 2010/0299673 A1 | 11/2010 | Shultz et al. | |
| 2011/0004875 A1 * | 1/2011 | Elnozahy | G06F 9/455 718/1 |
| 2011/0023027 A1 * | 1/2011 | Kegel | G06F 12/10 718/1 |
| 2011/0055435 A1 | 3/2011 | Nito et al. | |
| 2011/0126209 A1 * | 5/2011 | Housty | 718/105 |
| 2011/0138091 A1 * | 6/2011 | Housty | 710/113 |
| 2011/0138117 A1 | 6/2011 | Nakamura et al. | |
| 2011/0173405 A1 | 7/2011 | Grabarnik et al. | |
| 2011/0238927 A1 | 9/2011 | Hatano | |
| 2011/0320682 A1 * | 12/2011 | McDougall | G06F 12/023 711/6 |
| 2012/0072915 A1 | 3/2012 | Jones et al. | |
| 2012/0102183 A1 | 4/2012 | Murakami et al. | |
| 2012/0117347 A1 | 5/2012 | Fienblit et al. | |
| 2012/0124415 A1 * | 5/2012 | Borkenhagen | G06F 11/1666 714/6.3 |
| 2012/0131248 A1 * | 5/2012 | Abali | G06F 13/24 710/264 |
| 2012/0151152 A1 | 6/2012 | Minami et al. | |
| 2012/0151280 A1 * | 6/2012 | Niesser | G06F 11/1629 714/48 |
| 2012/0215959 A1 | 8/2012 | Kwon et al. | |
| 2012/0290766 A1 * | 11/2012 | Oshins | G06F 9/45537 711/6 |
| 2012/0311300 A1 | 12/2012 | Sundrani et al. | |
| 2013/0007352 A1 * | 1/2013 | Maislos | G06F 12/0246 711/103 |
| 2013/0031312 A1 | 1/2013 | Jones | |
| 2013/0042236 A1 * | 2/2013 | Kagan | G06F 9/45558 718/1 |
| 2013/0111308 A1 * | 5/2013 | Sauber | G06F 11/1004 714/807 |
| 2013/0132683 A1 | 5/2013 | Ajanovic et al. | |
| 2013/0138891 A1 | 5/2013 | Chockler et al. | |
| 2013/0174150 A1 * | 7/2013 | Nakajima | G06F 9/45558 718/1 |
| 2013/0198448 A1 | 8/2013 | Ish et al. | |
| 2013/0219328 A1 | 8/2013 | Rosen et al. | |
| 2013/0290641 A1 | 10/2013 | Corrie | |
| 2013/0305007 A1 * | 11/2013 | Kawano | G06F 12/0292 711/165 |
| 2013/0346668 A1 | 12/2013 | Floman et al. | |
| 2014/0007091 A1 * | 1/2014 | Arges | G06F 9/5011 718/1 |
| 2014/0022263 A1 * | 1/2014 | Hartog | G06T 1/20 345/506 |
| 2014/0040576 A1 | 2/2014 | Cordero et al. | |
| 2014/0089626 A1 * | 3/2014 | Schluessler | G06F 9/45558 711/170 |
| 2014/0181576 A1 * | 6/2014 | Chahal | G06F 9/45533 714/6.13 |
| 2014/0215129 A1 * | 7/2014 | Kuzmin | G06F 12/0246 711/103 |
| 2015/0113226 A1 | 4/2015 | Accapadi et al. | |
| 2015/0370711 A1 | 12/2015 | Cordero et al. | |

OTHER PUBLICATIONS

"Memory Controller Managed Backing of Superpages," IBM, Prior Art Database, IP.com No. IPCOM000033954D, Jan. 6, 2005, 4 pages.

(56) References Cited

OTHER PUBLICATIONS

Anonymous, "Method for Hardware Accelerated Real-Time Virtual Memory Management with Page Fault Prediction," Prior Art Database, IP.com No. IPCOM000074641D, Feb. 23, 2005, 8 pages.
Christopher, KW et al., "Profiling Technique for Memory References Within Individual Pages on Paging Based Virtual Memory Systems," IBM Technical Disclosure Bulletin, No. 3, Aug. 1992, pp. 320-325.
Herrero et al., "Elastic cooperative caching: an autonomous dynamically adaptive memory hierarchy for chip multiprocessors", Proceedings of the 37th Annual International Symposium on Computer Architecture, (Jun. 2010), pp. 419-428.
List of IBM Patents or Patent Applications Treated as Related, U.S. Appl. No. 14/573,970, filed Dec. 17, 2014, 2 pages.
U.S. Appl. No. 14/307,648, "Method and Apparatus for Cache Memory Data Processing,", Jun. 18, 2014, 31 Pages.
U.S. Appl. No. 14/573,970, "Method and Apparatus for Cache Memory Data Processing,", Dec. 17, 2014, 30 pages.
U.S. Appl. No. 13/565,503 entitled: Requesting a Memory Space by a Memory Controller; Aug. 2, 2012; (49 pages).
"Error Feedback and Logging With Memory On-Chip Error Checking and Correcting (ECC)", U.S. Appl. No. 14/168,460, filed Jan. 30, 2014.
Tansawa, et al., "A Compact On-Chip ECC for Low Cost Flash Memories", IEEE Journal of; Solid-State Circuits, vol. 32, No. 5, May 1997, pp. 662-669 [Abstract Only] [Available Online] http://ieeexplore.ieee.org/document/568829/.
Yoon, et al., "Flexible Cache Error Protection Using an ECC FIFO", ACM, Nov. 2009, 55 pages.
Altera—DDR and DDR2 SDRAM ECC Reference Design, Application Note 415, Altera Corporation, Version 1.0, Jun. 2006, 20 pp.

\* cited by examiner

REQUESTING MEMORY SPACES AND RESOURCES USING A MEMORY CONTROLLER

FIELD OF THE DISCLOSURE

The present disclosure generally relates to computer memory architecture, and in particular, to requesting memory spaces and resources, as well as processing requests for the memory spaces and the resources.

BACKGROUND

A computer system may have a variety of hardware devices that request and share resources (e.g., memory and processors) of the system. Device drivers typically act as bridges between the hardware devices and software managing the resources. Through the device drivers, the software may be able to determine which devices are on the system, the devices may request resources, and the devices may be granted the resources from the software.

However, a memory controller typically does not have the ability to share resources like other hardware devices or to be used by another entity for sharing resources. Moreover, the memory controller typically does not have a device driver to share resources like other hardware devices.

SUMMARY

In a particular embodiment, a method of requesting a resource using a memory controller is provided. The method may include communicating, by a memory controller, a request to a computer program for a resource, where the memory controller is configured to initialize a memory, and where the memory controller is configured to perform operations on the memory as instructed, and where the computer program is configured to make resources available in response to requests for the resources. The method may also include using, by the memory controller, the resource in response to an indication from the computer program that the resource is available.

In a particular embodiment, a method of requesting at least one of a memory space or a resource using a memory controller is provided. The method may include receiving, by a memory controller, a request from a first resource for at least one of a memory space of a memory or a second resource, where the memory controller is configured to communicate the request from the first resource to a computer program, where the memory controller is configured to initialize the memory, and where the memory controller is configured to perform operations on the memory as instructed, and where the computer program is configured to make memory spaces of the memory and resources available in response to requests for the memory spaces of the memory and the resources. The method may also include communicating, by the memory controller, a first indication to the first resource that the at least one of the memory space or the second resource is available in response to a second indication from the computer program that the at least one of the memory space or the second resource is available.

In a particular embodiment, a method of requesting at least one of a memory space or a resource using a memory controller is provided. The method may include communicating, by a first resource, a request to a memory controller for at least one of a memory space of a memory or a second resource, where the memory controller is configured to communicate the request from the first resource to a computer program, where the memory controller is configured to initialize the memory, and where the memory controller is configured to perform operations on the memory as instructed, and where the computer program is configured to make memory spaces of the memory and resources available in response to requests for the memory spaces of the memory and the resources. The method may also include using, by the first resource, at least one of the memory space or the second resource in response to an indication that the at least one of the memory space or the second resource is available.

These and other advantages and features that characterize embodiments of the disclosure are set forth in the claims annexed hereto and forming a further part hereof. However, for a better understanding of the disclosure, and of the advantages and objectives attained through its use, reference should be made to the drawings and to the accompanying descriptive matter in which there are described exemplary embodiments of the disclosure.

DETAILED DESCRIPTION

Figure 1A:
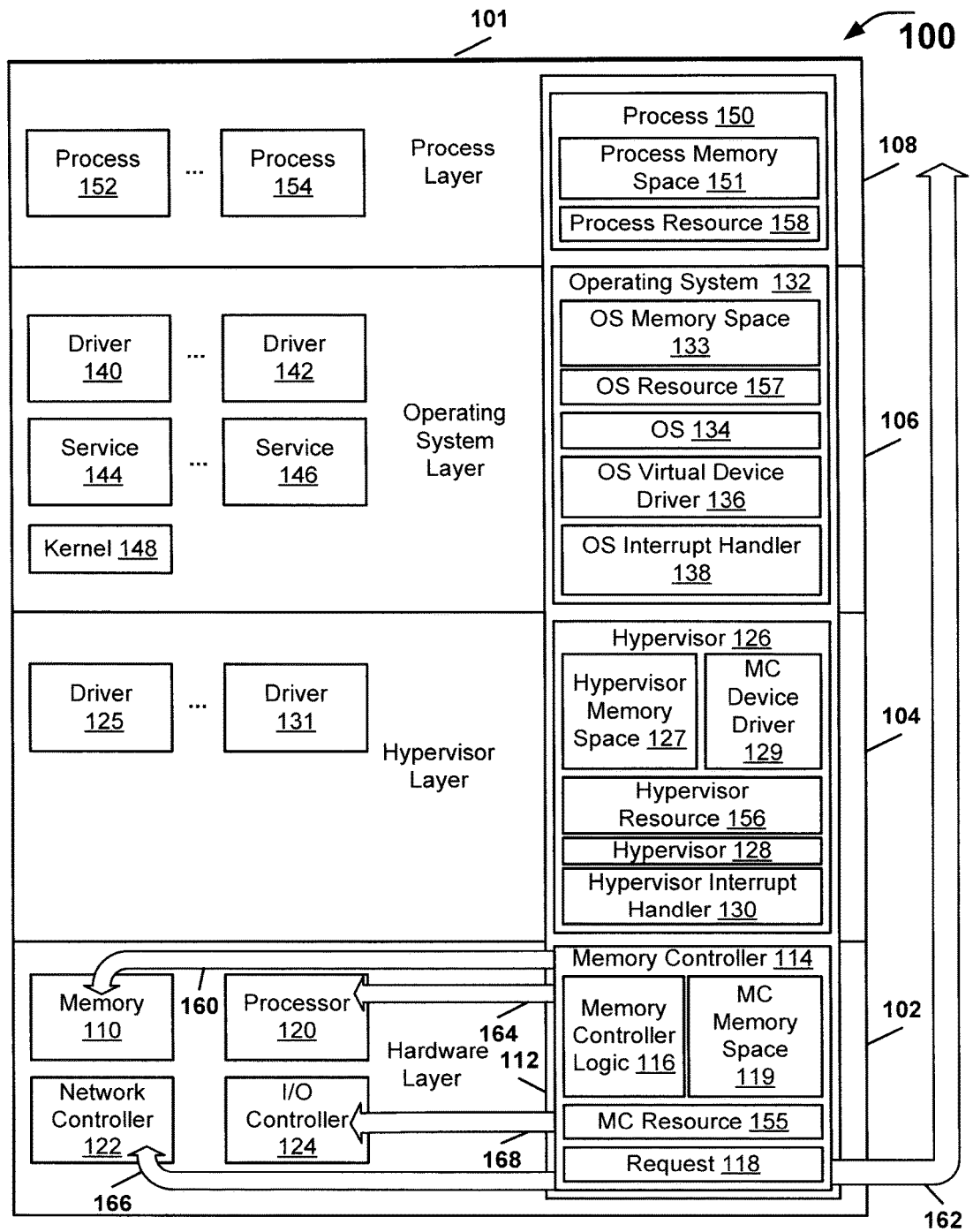
FIG. 1A is a block diagram of a computing system configured to process a request for a memory space and/or a resource from a memory controller.

Embodiments of systems and methods allow a memory controller to share resources (e.g., memory) in a manner similar to or alike another hardware device. For example, a device driver may be used by the memory controller to communicate with a computer program (e.g., software) and request resources (e.g., memory spaces) from the computer program. The computer program may run the device driver. The memory controller may request memory spaces of different amounts, at different times, and for different reasons. The computer program may allocate the memory spaces to the memory controller via the device driver in response to the requests. The memory controller may use the memory spaces it has been allocated by the computer program.

The memory controller may communicate through the device driver. The device driver may communicate with the computer program to share resources like another hardware device or even another application. The computer program may be at least one of a hypervisor computer program ("hypervisor"), an operating system computer program ("operating system" or "OS"), a process computer program ("process"), a Basic Input Output System computer program ("BIOS"), or a keyboard video mouse computer program ("KVM"). The computer program configured to make memory spaces and/or resources available may depend on the particular configuration of a computer system. For example, in a particular embodiment, a computer system may not include a hypervisor; instead, an operating system of that computer system may be configured to make memory spaces and/or resources available in response to requests for the memory spaces and/or resources. Thus, in that particular embodiment, the operating system may run the device driver and a memory controller may communicate through the device driver that communicates with the operating system to share resources like another hardware device or even another application. The computer program may be practically any program code configured to at least make memory spaces of the memory and/or resources available in response to requests for the memory spaces and/or resources. Requests for resources are discussed hereinbelow.

For simplicity, terminology such as the computer program is configured to make memory spaces of the memory and/or resources available in response to requests for the memory spaces and/or resources are utilized herein. The terminology may include only an allocation of a memory space and/or a resource, a de-allocation and an allocation of a memory space and/or a resource, only a de-allocation of a memory space and/or a resource, or practically any manner of making a memory space of the memory and/or a resource available to the memory controller. The availability of memory space and/or a resource may change quickly and may depend on data at the time of the determination. Thus, terminology such as "the memory space and/or a resource are available" or "the memory space and/or a resource are available for use" may include "the memory space and/or the resource is likely available" or "the memory space and/or the resource is likely available for use," respectively.

The requested memory space may correspond to a memory that may be a physical memory, for example, the requested memory space may correspond to, but not limited to, pages, a region, or physical addresses of the physical memory. The memory space (or pages) may be pinned and mapped virtual to physical. For simplicity, the term "memory space" is utilized herein.

In addition to sharing resources, the memory controller may be configured to act as a gatekeeper of the memory. As gatekeeper, the memory controller may be configured to initialize the memory and perform operations on the memory as instructed. For example, during an initialization period (e.g., startup), the memory controller may initialize the memory of the computer system with settings, calibrate the memory's interface, perform accesses to test the memory, and ensure that the memory may be properly utilized in the computer system. Once the initialization period is complete, the memory controller may surrender control of the memory to the computer program (e.g., a hypervisor or an operating system), and the computer program controls the memory and its content.

After the initialization period, the memory controller may perform operations on the memory as instructed (e.g., perform read and write operations on the memory as instructed). However, the memory controller may not have control over the memory after the initialization period despite its role as gatekeeper of the memory. The memory controller may also ensure data integrity of the memory's content with built in error detection, correction facilities, and/or redundant memory bits, but the memory and its content may be preserved for the computer program. After the initialization period may therefore include a period after the memory controller has initialized the memory and given up control of the memory to the computer program (e.g., hypervisor or operating system).

After the initialization period, the memory controller may facilitate processor and input/output access to the memory, but the memory controller may not directly control the memory and its content after the initialization period. Instead, after the initialization period, the computer program may take control of the memory and its content. For example, a hypervisor may control how the memory is allocated to operating system (OS) instances, and each OS instance may control how its allocated memory is further allocated to user processes. As a result, even though the memory controller is the gatekeeper of the memory, the memory controller may not be able to get any of the memory after the initialization period without the embodiments disclosed herein that allow the memory controller to request memory spaces of the memory (e.g., from the hypervisor).

Thus, the memory controller may be able to communicate a request for a memory space of the memory to the computer program, as well as initialize the memory and perform operations on the memory as instructed. The memory controller may communicate with the computer program through the device driver of the memory controller, and the computer program may run the device driver. The memory controller may use the memory space in response to an indication from the computer program that the memory space is available. The computer program may be configured to make memory spaces of the memory available in response to requests for the memory spaces, such as requests for memory spaces from the memory controller.

The memory controller may use a memory space that is available in a variety of ways. For example, the memory controller may use the memory space for at least one of testing, calibrating, tracing, caching, optimizing, computing, transforming, encrypting, decrypting, prefetching, paging, precoding, predecoding, compressing, decompressing, remapping, mirroring, shadowing, or as a scratch pad. The memory controller's use of the memory space may lead to improvements in flexibility, data integrity, system performance, system efficiency, system reliability, accuracy, etc.

Second, embodiments are also provided herein that allow the memory controller to request other resources, not just memory spaces. For example, the memory controller may request a resource such as a processor resource (e.g., a CPU, etc.). The memory controller may also request a resource such as an input-output resource (e.g., a storage device, a SSD, a DASD, a direct attach device (DAD), an input-output (I/O) controller, a network controller, etc.). The memory controller may request practically any other resource per the embodiments discussed herein.

Moreover, the memory controller may request only a memory space, only a resource, or both a memory space and a resource with a single request. As an example, after the initialization period, the memory controller may communicate a request to the computer program through at least one of the device driver or the virtual device driver for only a memory space, for only a resource, or for both a memory space and a resource. The computer program may be at least one of the hypervisor computer program, the operating system computer program, the process computer program, the Basic Input Output System computer program, or the keyboard video mouse computer program. Furthermore, the memory controller may request a single resource or multiple resources, a specific resource or a general resource, etc.

The memory controller may use the resource in response to an indication from the computer program that the resource is available. The memory controller may use the resource that is available in a variety of ways. The memory controller may use the resource for at least one of upstream data processing or upstream data storage. The memory controller may use the resource for at least one of downstream data processing or downstream data storage. The memory controller may use the resource for at least one of testing, calibrating, tracing, caching, optimizing, computing, transforming, encrypting, decrypting, prefetching, paging, precoding, predecoding, compressing, decompressing, remapping, mirroring, shadowing, or as a scratch pad. Using the resource may include interlocking, by the memory controller, with the resource.

Third, embodiments are also provided herein that allow the memory controller to be used by a first resource for requesting at least one of a memory space or a resource. For example, after the initialization period, a first resource may communicate a request to the memory controller for at least one of a memory space of a memory or a second resource. The first resource may be at least one of the processor resource (e.g., CPU, etc.) or the input-output resource (e.g., a storage device, a SSD, a DASD, a direct attach device (DAD), an input-output (I/O) controller, a network controller, etc.). Moreover, the second resource may be at least one of a processor resource or an input-output resource. For example, the memory controller may receive a request from a processor resource for a memory space, for a processor resource, for an input-output resource, and/or some other resource. Alternatively, the memory controller may receive a request from an input-output resource for a memory space, for a processor resource, for an input-output resource, and/or some other resource.

After receiving the request from the first resource, the memory controller may be configured to communicate the request from the first resource to the computer program. The request from the first resource may be for only a memory space, only a second resource, or both a memory space and a second resource. For example, the memory controller may communicate the request to the computer program through at least one of the device driver or the virtual device driver for only a memory space, for only a second resource, or for both a memory space and a second resource. The computer program may be at least one of the hypervisor computer program, the operating system computer program, the process computer program, the Basic Input Output System computer program, or the keyboard video mouse computer program. The first resource may request, for example, a single second resource or multiple second resources, a specific second resource or a general second resource, etc.

The memory controller may communicate a first indication to the first resource that the at least one of the memory space or the second resource is available in response to a second indication from the computer program that the at least one of the memory space or the second resource is available. And, the first resource may use the at least one of the memory space or the second resource in response to the first indication from the memory controller that the at least one of the memory space or the second resource is available.

The first resource may use the at least one of the memory space or the second resource that is available in a variety of ways. The first resource may use the at least one of the memory space or the second resource for at least one of upstream data processing or upstream data storage. The first resource may use the at least one of the memory space or the second resource for at least one of downstream data processing or downstream data storage. The first resource may use the at least one of the memory space or the second resource for at least one of testing, calibrating, tracing, caching, optimizing, computing, transforming, encrypting, decrypting, prefetching, paging, precoding, predecoding, compressing, decompressing, remapping, mirroring, shadowing, or as a scratch pad.

The terminology, "at least one of a memory space or a resource" and "at least one of a memory space of a memory or a second resource," may be used interchangeably herein with "memory space and/or resource." Those of ordinary skill in the art may appreciate that practically any memory space, any resource, or combination thereof may be requested using the memory controller. The memory controller may request a memory space and/or resource for its use, as well as request a memory space and/or resource (e.g., a second resource) on behalf of a another resource (e.g., a first resource).

As such, the memory controller may request memory spaces and/or resources for itself or on behalf of a first resource. The requests may be made and granted for exclusive use of memory spaces and/or resources. Moreover, the memory controller may carry out this role alongside conventional methodologies for obtaining memory spaces and/or resources, and, memory spaces and/or resources that are not being utilized by conventional methodologies may be allocated to the memory controller or the first resource in response to the requests for memory spaces and/or resources from the memory controller for itself or on behalf of the first resource. By expanding the role of the memory controller, utilization of memory spaces and/or resources may improve, which may in turn lead to improvements in speed and efficiency.

Turning to FIG. 1A, the drawing illustrates an overview of a first embodiment of an apparatus 100 configured to process a request for a memory space and/or a resource from a memory controller (e.g., a request that is communicated after an initialization period). The request may be made and granted for exclusive use of a memory space and/or a resource. The apparatus 100 of FIG. 1A may also process a request for a memory space and/or resource generated by a first resource using the memory controller, as discussed in connection with FIGS. 1B-1C. Returning to FIG. 1A, the apparatus 100, in specific embodiments, may include a computer, a computer system, a computing system, a computing device, a server, a disk array, client computing entity, or other programmable device, such as a multi-user computer, a single-user computer, a handheld device, a networked device (including a computer in a cluster configuration), a mobile phone, a video game console (or other gaming system), etc. The apparatus 100 may be referred to as a logically partitioned computing system or computing system, but may be referred to as computer for the sake of brevity. One suitable implementation of the computer 101 may be a multi-user computer, such as a computer available from International Business Machines Corporation (IBM).

The computer 101 may include a hardware layer 102, a hypervisor layer 104 above the hardware layer 102, an operating system layer 106 above the hypervisor layer 104, and a user process layer or simply process layer 108 above the operating system layer 106. Elements such as those illustrated in area 112 from the layers 102, 104, 106, 108 may be utilized to generate and process a request 118 for a memory space and/or a resource from a memory controller 114, as well as initialize and perform operations on a memory 110 as instructed (e.g., by the hypervisor layer 104, the operating system layer 106, and/or the process layer 108). The request 118 may be made and granted for exclusive use of a memory space and/or a resource.

Of note, although FIGS. 1A-1C and FIG. 2 include a hypervisor that makes memory spaces and/or resources available in response to requests for memory spaces and/or resources, a hypervisor is not required in some embodiments. For example, in a particular embodiment, the apparatus 100 of FIGS. 1A-1C may not include the hypervisor layer 104 or items thereof, and instead, an operating system 132 of the operating system layer 106 may be the computer program that makes memory spaces and/or resources available for use. Moreover, in some embodiments, the computer program may not be a hypervisor or an operating system. For example, a particular embodiment of the apparatus 100 may simply include a computer program that the memory controller 114 may communicate with and request memory spaces and/or resources bfrom, and the computer program may be configured to make memory spaces (e.g., of the memory 110) and/or resources (e.g., a processor 120, a network controller 122, and/or an I/O controller 124) available in response to requests for the memory spaces and/or the resources, such as a request 118. The computer program may simply "think" it owns a machine and is configured to make memory spaces (e.g., of the memory 110) and/or resources (e.g., the processor 120, the network controller 122, and/or the I/O controller 124) available when requested to do so.

Returning to the computer 101, the hardware layer 102 may include the memory 110, the memory controller 114 with memory controller logic 116 (e.g., hardware logic), the request 118 for a memory space (e.g., of the memory 110) and/or a resource (e.g., the processor 120, the network controller 122, and/or the I/O controller 124), a memory controller ("MC") memory space 119, and a MC resource 155. The memory 110 may be the main storage for computer 101, and may include random access memory (RAM), a dynamic random access memory (DRAM), a static random access memory (SRAM), a dual in-line memory module (DIMM), a flash memory, a hard disk drive, and/or another digital storage medium. The memory 110 may be coupled to the memory controller 114.

The memory controller logic 116 may be configured to cause the memory controller 114 to generate and communicate the request 118 to the hypervisor 126 of the hypervisor layer 104 through a memory controller ("MC") device driver 129. The memory controller logic 116 may also be configured to initialize the memory 110 and perform operations on the memory 110 as instructed (e.g., by the hypervisor layer 104, the operating system layer 106, and/or the process layer 108). The MC memory space 119 is meant to illustrate at least one memory space of the memory 110 made available (e.g., by the hypervisor 126 via the MC device driver 129 or other computer program) for use by the memory controller 114 in response to the request 118. The MC resource 155 is meant to illustrate at least one resource made available (e.g., by the hypervisor 126 via the MC device driver 129 or other computer program) for use by the memory controller 114 in response to the request 118. The memory controller logic 116 may also be configured to cause the memory controller 114 to use the MC memory space 119 and/or the MC resource 155 in response to an indication (e.g., interrupt, acknowledgement, data, etc.) from the hypervisor 126 that the memory space and/or the resource are available.

The hardware layer 102 of the computer 101 may also include at least one physical processor 120, as well as at least one bus (not shown). For example, the bus may be a power bus. The processor 120 may be multithreaded and/or may have multiple cores. The hardware layer 102 may also include the network controller 122 and the I/O controller 124. The network controller 122 may provide access to at least one network. The I/O controller 124 may provide access to at least one I/O device. As such, the computer 101 may be coupled to a number of external input/output (I/O) devices via the bus and a plurality of interface devices that are not shown, for example, a workstation controller and/or a storage controller that respectively provide external access to one or more workstations and/or one or more storage devices such as a direct access storage device (DASD). The bus may also be coupled to a user input (not shown) operable by a user of the computer 101 to enter data (e.g., the user input sources may include a mouse, a keyboard, etc.) and a display (not shown) operable to display data from the computer 101 (e.g., the display may be a CRT monitor, an LCD display panel, etc.). The computer 101 may also be configured as a member of a distributed computing environment and communicate with other members of that distributed computing environment through a network.

The hypervisor layer 104 may include the hypervisor 126, a hypervisor memory space 127 (e.g., corresponding to the hypervisor 126's allocation of the physical memory 110 that the hypervisor 126 controls), a hypervisor resource 156 (e.g., corresponding to the hypervisor 126's allocation of the processor 120, the network controller 122, and/or the I/O controller 124 that the hypervisor 126 controls), a hypervisor 128 (e.g., to represent the program code of the hypervisor 126), the MC device driver 129, and a hypervisor interrupt handler 130. In particular, the MC device driver 129 is illustrated in the hypervisor layer 104 because the hypervisor 126 may run the MC device driver 129 for communication with the memory controller 114. For example, the MC device driver 129 may request a memory space of the memory 110 from the hypervisor 126, such as a 4 k page, and that 4 k page may be used to communicate through the memory controller 114 to the MC device driver 129 to the hypervisor 126 for the rest of the computer 101's operation. The request 118 may be communicated to the hypervisor 126 via the MC device driver 129. In some embodiments, the MC device driver 129 may also have memory spaces and/or resources allocated to it like the hypervisor 126, and these memory spaces and/or these resources of the MC device driver 129 may be utilized to respond to the request 118 of the memory controller 114. As such, the hypervisor memory space 127 and/or the hypervisor resource 156 may also represent the memory spaces and/or the resources of the MC device driver 129 or practically any memory space and/or resource at this level that may be made available upon request. The hypervisor 126 may run other device drivers for other devices, such as drivers 125, 131.

Nonetheless, at least one of the hypervisor 128, the MC device driver 129, or the hypervisor interrupt handler 130 may be utilized to process the request 118 depending on the particular embodiment. For example, the memory controller 114 may communicate the request 118 to the MC device driver 129 that communicates with the hypervisor 126. The memory controller 114 may generate an interrupt regarding the request 118 and the interrupt may be handled by the MC device driver 129. Alternatively or additionally, interrupts may be handled by the hypervisor interrupt handler 130 in some embodiments. In some embodiments, the MC device driver 129 may be primarily responsible for processing the request 118 from the memory controller 114.

At least one of the hypervisor 128, the MC device driver 129, or the hypervisor interrupt handler 130 may be configured to determine if the memory space and/or the resource are available from the hypervisor memory space 127 and/or the hypervisor resource 156. If the memory space and/or the resource are available to fill the request 118, at least one of the hypervisor 128, the MC device driver 129, or the hypervisor interrupt handler 130 may deallocate the hypervisor memory space 127 and/or the hypervisor resource 156, and/or allocate the memory space and/or the resource to the memory controller 114 accordingly. In some embodiment, the MC device driver 129 may even determine whether the MC device driver 129 has an available memory space and/or an available resource to fill the request 118 and whether to fill the request 118 from this memory space and/or this resource. An indication (e.g., acknowledgement to the interrupt from the memory controller 114) may be generated and communicated to the memory controller 114 by at least one of the hypervisor 128, the MC device driver 129, or the hypervisor interrupt handler 130 to indicate that the memory space and/or the resource are available.

If the memory space and/or the resource is not available from the hypervisor memory space 127 and/or the hypervisor resource 156, at least one of the hypervisor 128, the MC device driver 129, or the hypervisor interrupt handler 130 may determine whether the memory space and/or the resource are available from the operating system layer 106 and/or from the process layer 108. At least one of the hypervisor 128, the MC device driver 129, or the hypervisor interrupt handler 130 may send to the memory controller 114 at least one of an indication that the memory space and/or the resource is not available from the hypervisor 126, an indication that the memory space and/or the resource are available from an operating system ("OS") 132, or an indication that the memory space and/or the resource are available from a process 150 based on the determination.

As such, the memory controller 114, via an OS virtual device driver 136, may communicate the request 118 for the memory space and/or the resource to the operating system layer 106 in response to the indication from the hypervisor 126. The operating system layer 104 may include the OS 132, OS memory space 133 corresponding to the OS 132's allocation of memory space (e.g., from the hypervisor 126), a OS resource 157 corresponding to the OS 132's allocation of the processor 120, the network controller 122, and/or I/O controller 124 (e.g., from the hypervisor 126), OS 134 (e.g., program code of the OS 132), the OS virtual device driver 136, and an OS interrupt handler 138. For example, the OS virtual device driver 136 may behave like the MC device driver 129, and the memory controller 114 may communicate the request 118 to the OS virtual device driver 136 that communicates with the OS 132. Other items may also be loaded in the operating system layer 104, for example, other drivers (e.g., other virtual drivers) such as drivers 140, 142, a service such as a service 144 for networking and a service 146 for disk swap control, and a kernel 148.

In some embodiments, the OS virtual device driver 136 may have memory spaces and/or resources allocated to it, and these memory spaces and/or these resources of the OS virtual device driver 136 may be utilized to respond to the request 118 of the memory controller 114. As such, the OS memory space 133 and/or the OS resource 157 may also represent the memory spaces and/or the resources of the OS virtual device driver 136 or practically any memory space and/or any resource at this level that may be made available upon request.

Nonetheless, at least one of the OS 134, the OS virtual device driver 136, and the OS interrupt handler 138 may be utilized to process the request 118 depending on the particular embodiment. For example, the memory controller 114 may communicate the request 118 to the OS virtual device driver 136 that communicates with the OS 132. The memory controller 114 may generate an interrupt regarding the request 118 and the interrupt may be handled by the OS virtual device driver 136. Alternatively or additionally, interrupts may be handled by the OS interrupt handler 138 in some embodiments. In some embodiments, the OS virtual device driver 136 may be primarily responsible for processing the request 118 from the memory controller 114.

At least one of the OS 134, the OS virtual device driver 136, and the OS interrupt handler 138 may be configured to determine if the memory space and/or the resource are available from the OS memory space 133 and/or the OS resource 157. If the memory space and/or the resource are available to fill the request 118, at least one of the OS 134, the OS virtual device driver 136, or the OS interrupt handler 138 may deallocate the OS memory space 133 and/or the OS resource 157, and/or allocate the memory space and/or the resource to the memory controller 114 accordingly. In some embodiments, the OS virtual device driver 136 may determine whether the OS virtual device driver 136 has an available memory space and/or an available resource to fill the request 118 and whether to fill the request 118 from this memory space and/or this resource. An indication (e.g., acknowledgement to the interrupt from the memory controller 114) may be generated and sent to the memory controller 114 by at least one of the OS 134, the OS virtual device driver 136, or the OS interrupt handler 138 to indicate that the memory space and/or the resource are available. Likewise, if not available, an indication may be generated and sent to the memory controller 114 to indicate that the memory space and/or the resource is not available from the OS 132.

The MC memory space 119 may represent at least one memory space of the memory 110 made available (e.g., by the OS 132 or other computer program) for use by the memory controller 114 in response to the request 118. The MC resource 155 may represent at least one resource made available (e.g., by the OS 132 or other computer program) for use by the memory controller 114 in response to the request 118.

Alternatively, the memory controller 114 may send the request 118 for the memory space and/or the resource to the process layer 108, for example, due to the OS virtual device driver 136 spawning the process 150 instead of using its own memory space and/or its own resource and the memory space and/or the resource of the OS 132. As another example, the process 150 may be created and dedicated to assist with the processing of the request 118, and the request 118 may be communicated to the process layer 108 in response to the indication from the hypervisor 126.

The process layer 108 may include the process 150, a process memory space 151 corresponding to the process 150's allocation of memory space (e.g., from the operating system layer 106), a process resource 158 corresponding to the process 150's allocation of the processor 120, the network controller 122, and/or the I/O controller 124 (e.g., from the operating system layer 106), and other processes such as processes 152, 154. The process 150 may receive the request 118 for the memory space and/or the resource from the memory controller 114 and request the memory space and/or the resource from the OS 132. For example, if the process 150 is provided with the memory space and/or the resource from the OS 132, the process 150 may send an indication to the memory controller 114 that the memory space and/or the resource are available. Of note, the terminology "process" is utilized herein for simplicity, but the process 150 may be an application or other entity.

The MC memory space 119 may represent at least one memory space of the memory 110 made available (e.g., by the process 150 or other computer program) for use by the memory controller 114 in response to the request 118. The MC resource 155 may represent at least one resource made available (e.g., by the process 150 or other computer program) for use by the memory controller 114 in response to the request 118.

Thus, in FIG. 1A, the memory controller 114 may request a memory space (e.g., associated with the memory 110) as illustrated by the arrow 160 via the request 118. The request 118 may be communicated to the hypervisor layer 104, the operating system layer 106, and/or the process layer 108 (as generally illustrated by arrow 162), and the request 118 may be processed as explained hereinabove.

Furthermore, the apparatus 100 of FIG. 1A may be configured to process a request for a resource from a memory controller (e.g., a request that is communicated after an initialization period). For example, the memory controller 114 may request a resource (e.g., a processor resource such as the processor 120 as illustrated by arrow 164, an input-output resource such as the network controller 122 as illustrated by arrow 166, and/or an input-output resource such as the I/O controller 124 as illustrated by arrow 168) with the request 118. The request 118 may be for only a resource or for both a resource and a memory space, as appropriate. The request 118 may be communicated to the hypervisor layer 104, the operating system layer 106, and/or the process layer 108 (as generally illustrated by arrow 162). The memory controller 114 may request a resource in a manner that is similar to requesting a memory space. Furthermore, a request for a resource from the memory controller may be processed in a manner similar to processing a request for a memory space.

Of note, in FIG. 1A, the request 118 for the memory space and/or the resource may be generated by the memory controller 114. Moreover, the memory space and/or the resource may be allocated to the memory controller 114 and used by the memory controller 114 in a variety of ways. Alternatively, or additionally, the memory controller 114 may request memory spaces and/or resources on behalf of a first resource, as in FIGS. 1B-1C.

Figure 1B:
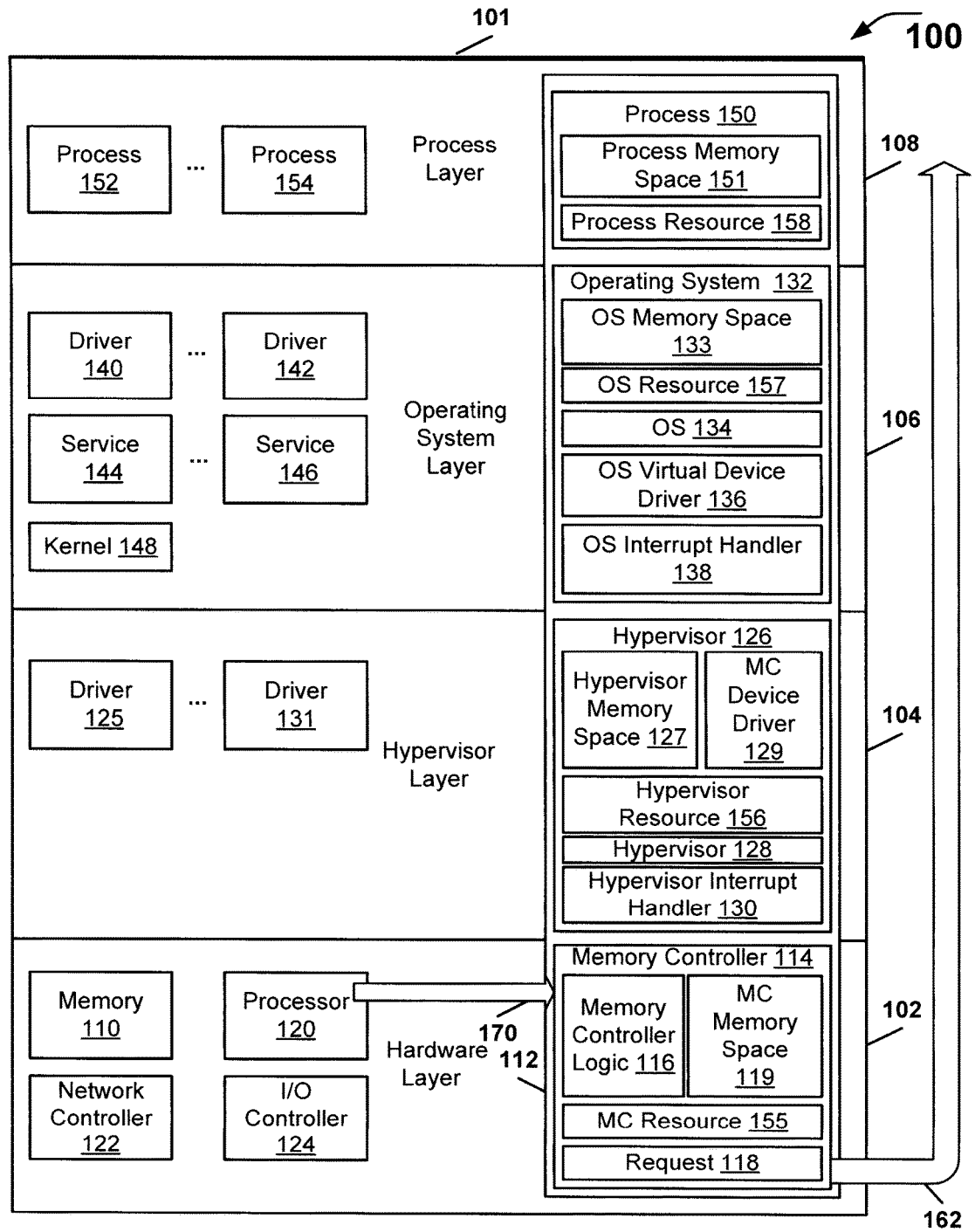
FIG. 1B is a block diagram of a computing system configured to process a request for a memory space and/or a resource (e.g., a second resource) from a memory controller, where the request is generated by a first resource (e.g., a processor resource).

FIG. 1B is a block diagram of a computing system configured to process a request for a memory space and/or a resource (e.g., a second resource) from a memory controller, where the request is generated by a first resource (e.g., a processor resource). For example, after the initialization period, the processor 120 may generate and communicate the request 118 to the memory controller 114 for at least one of a memory space of the memory 110 or a second resource of the network controller 122, the I/O controller 124, etc. (as generally illustrated by arrow 170). The memory controller 114 may receive the request 118 from the processor 120. The request 118 may be communicated by the memory controller 114 to the hypervisor layer 104, the operating system layer 106, and/or the process layer 108 (as generally illustrated by arrow 162). The request 118 may be processed as explained hereinabove in connection with requesting memory spaces and/or resources in FIG. 1A.

The memory controller 114 may communicate a first indication to the processor 120 that the at least one of the memory space or the second resource is available in response to a second indication from the hypervisor layer 104, the operating system layer 106, and/or the process layer 108) that the at least one of the memory space or the second resource is available. The processor 120 may use the at least one of the memory space or the second resource in response to the first indication from the memory controller 114 that the at least one of the memory space or the second resource is available in a variety of ways.

Figure 1C:
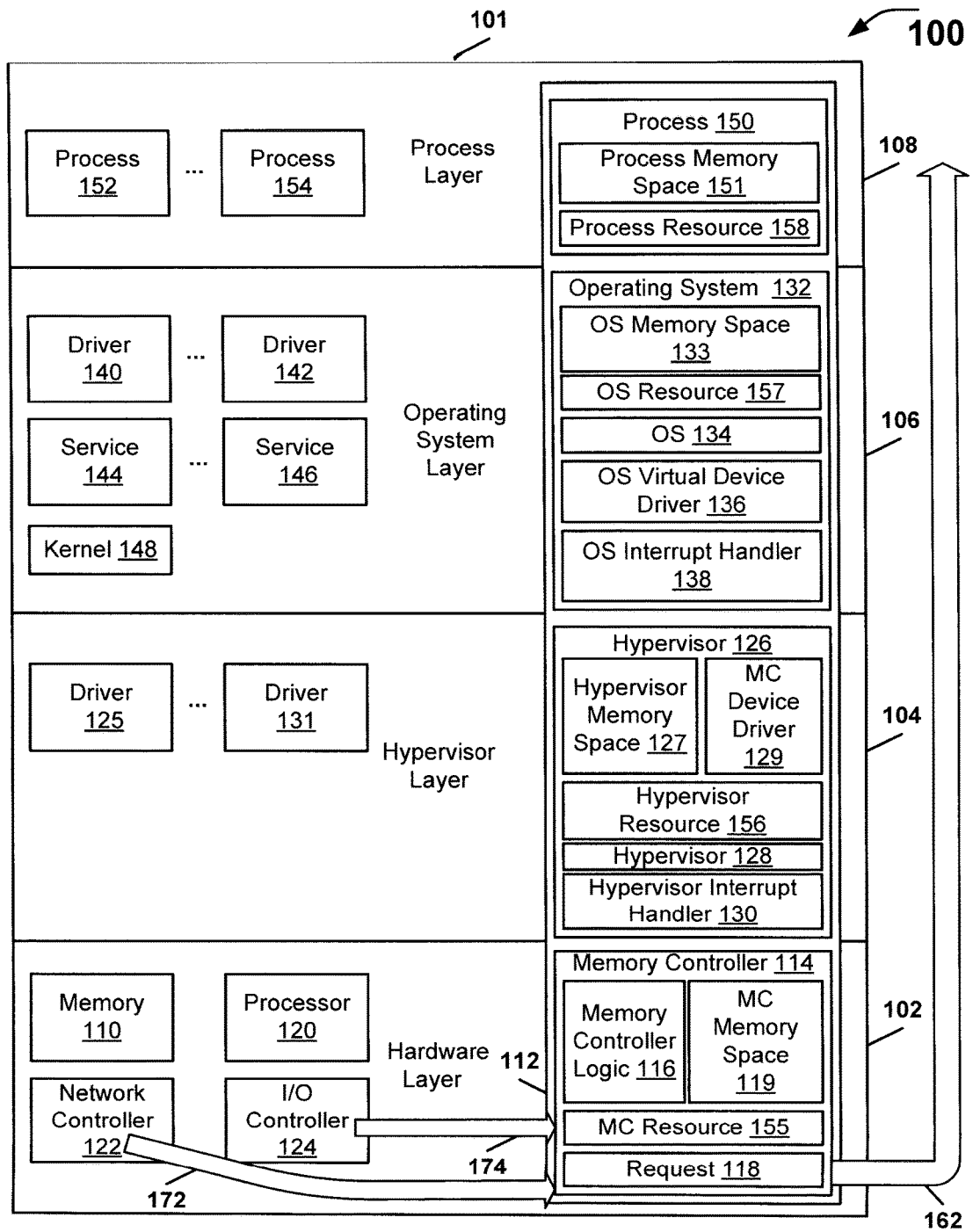
FIG. 1C is a block diagram of a computing system configured to process a request for a memory space and/or a resource (e.g., a second resource) from a memory controller, where the request is generated by a first resource (e.g., an input-output resource).

FIG. 1C is a block diagram of a computing system configured to process a request for a memory space and/or a resource (e.g., a second resource) from a memory controller, where the request is generated by a first resource (e.g., an input-output resource). For example, after the initialization period, the network controller 122 may generate and communicate the request 118 to the memory controller 114 for at least one of a memory space of the memory 110 or a second resource of the processor 120, the I/O controller 124, etc. (as generally illustrated by arrow 172). As another example, after the initialization period, the I/O controller 124 may generate and communicate the request 118 to the memory controller 114 for at least one of a memory space of the memory 110 or a second resource of the processor 120, the network controller 122, etc. (as generally illustrated by arrow 174).

Returning to the network controller 122 example, the memory controller 114 may receive the request 118 from the network controller 122. The request 118 may be communicated by the memory controller 114 to the hypervisor layer 104, the operating system layer 106, and/or the process layer 108 (as generally illustrated by arrow 162). The request 118 may be processed as explained hereinabove in connection with requesting memory spaces and/or resources in FIG. 1A.

The memory controller 114 may communicate a first indication to the network controller 122 that the at least one of the memory space or the second resource is available in response to a second indication from the hypervisor layer 104, the operating system layer 106, and/or the process layer 108) that the at least one of the memory space or the second resource is available. The network controller 122 may use the at least one of the memory space or the second resource in response to the first indication from the memory controller 114 that the at least one of the memory space or the second resource is available in a variety of ways.

Figure 2:
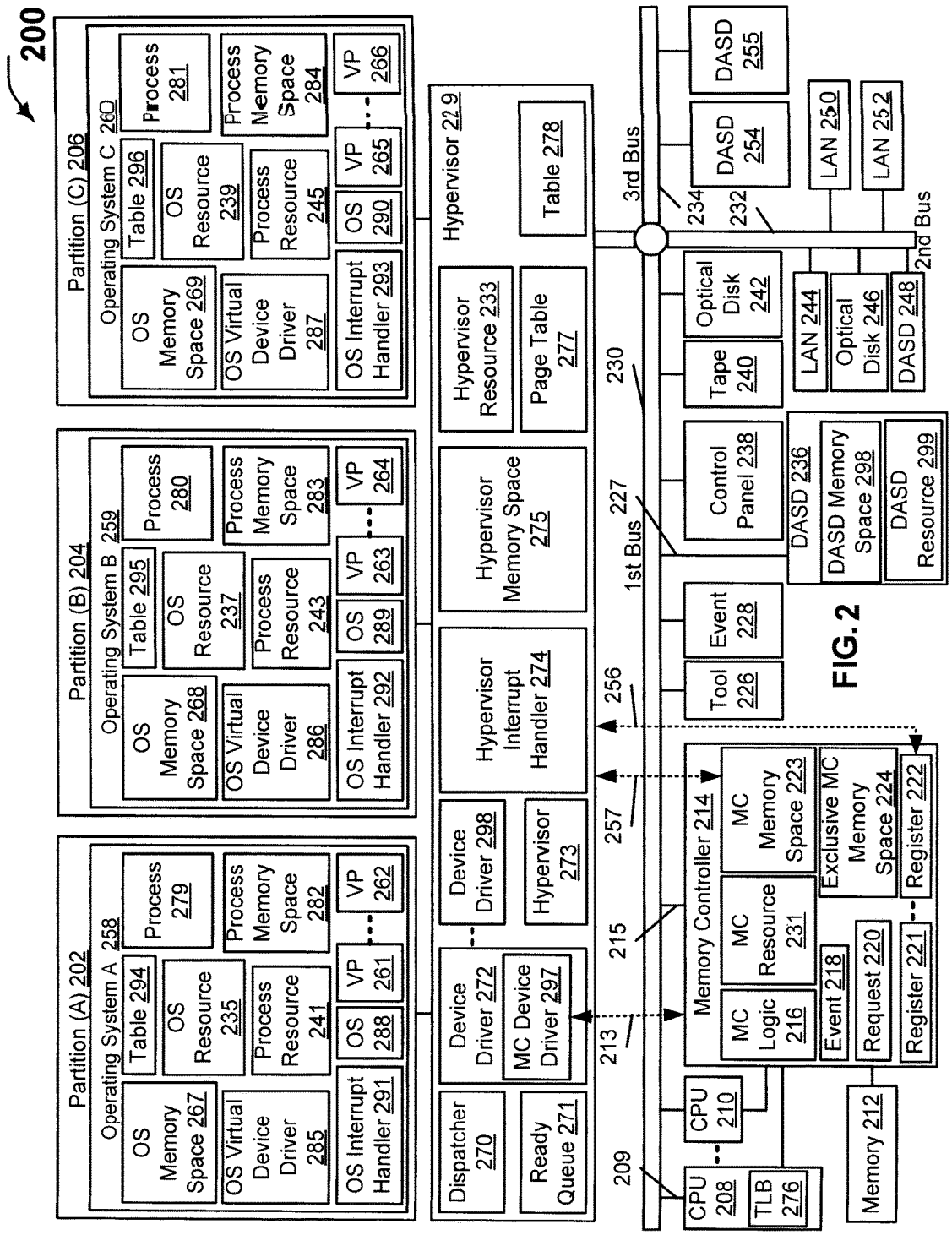
FIG. 2 is a block diagram of the primary software and hardware components of the computing system of FIGS. 1A-1C.

FIG. 2 illustrates in greater detail the primary software and hardware components used to implement a logically partitioned environment, consistent with the apparatus 100 of FIGS. 1A-1C, to process a request for a memory space and/or a resource from a memory controller for its own use or on behalf of a first resource. The request may be made and granted for exclusive use of a memory space and/or a resource. The request may be communicated after an initialization period. In particular, FIG. 2 illustrates a logically partitioned computing system 200 having a virtual machine design, as developed by IBM. Like names in FIGS. 1A-2 may denote similar elements. For example, the memory controller 114 of FIGS. 1A-1C may be similar to memory controller 214 of FIG. 2. The MC device driver 129 of FIGS. 1A-1C may be similar to MC device driver 297 of FIG. 2.

The computing system 200 includes a plurality of partitions, such as partitions 202, 204 and 206, that share common resources. The computing system 200 may use a single computing machine having one or more physical processors 208, 210, or central processing units (CPU's), coupled with the memory controller 214. The memory controller 214 may be coupled to physical memory 212. The memory 212 may be a DIMM, DRAM, etc. For example, the memory 212 may be at least one terabyte. The processor 208 may include at least one translation look aside buffer ("TLB") 276. The TLB 276 may be a hardware cache of the processor 208 with about 128 page table entries to about 256 page table entries that may be used by the processor 208 to translate virtual or logical addresses to physical addresses (or vice versa) of the memory 212.

The memory controller 214 may be considered a trusted memory resource user, trusted hardware, and/or trusted device as it may be part of a chip of the computing system 200, as opposed to a piece of external hardware (e.g., an IO card) that is later added to the computing system 200. The term "trusted device" is utilized herein. As a trusted device, the memory controller 214 may have fewer restrictions on how it uses a memory space and/or a resource than an un-trusted device. However, in some embodiments, the memory controller 214 may not be treated as a trusted device.

The memory controller 214 may include memory controller logic 216 (e.g., hardware logic) to cause the memory controller 214 to initialize the memory 212 during the initialization period. Moreover, the memory controller logic 216 may cause the memory controller 214 to surrender control of the memory 212 after the initialization period and perform operations on the memory 212 after the initialization period as instructed. The memory controller logic 216 may also be configured, after the initialization period, to detect at least one event 218 and generate at least one request 220 for a memory space and/or a resource in response to the event 218.

The event 218 may be a memory controller timer event (e.g., a calibration timer or a scrub timer), a performance event, a maintenance event, a repair event, a memory debug event, a memory analysis event, an error event, or any combination thereof. An error event may be an error correcting code ("ECC") error and/or surpassing an error threshold. For example, an ECC error may continue to occur at a location (e.g., location 742 every two seconds), and after a certain error threshold is surpassed, an event may occur. The event 218 may cause the memory controller 214 to wake up, generate the request 220, and participate in resource sharing through the MC device driver 297.

For example, a repeated ECC error at location 742 every two seconds may surpass an error threshold causing the event 218. Responsive to the event 218, the memory controller 214 may wake up, communicate the request 220 for a memory space (e.g., request location 742 and another memory space) and/or a resource (e.g., request a processor resource such as any of the processors 208, 210 and/or request an input-output resource such as any of DASDs 236, 248, 254, 255, local area network (LAN) adapters 244, 250, 252, optical disk drives 242, 246, etc.) through its own device driver, the MC device driver 297. After the memory space and/or the resource is made available for use, the memory controller 214 may copy over data, run patterns, and/or determine what is wrong with location 742. Once the memory controller 214 is done running patterns and collecting data, the memory controller 214 may run a spare, take some action to fix or map out location 742, and/or may return or may not return location 742 (e.g., continue to hold until a particular application does not need location 742 anymore).

Although the event 218 may be utilized as a trigger to generate the request 220, the request 220 may be generated in other ways as well. For example, the request 220 may be generated speculatively based on a potential need of any of the processors 208, 210 or based on an actual need of any of the processors 208, 210. For example, the memory controller logic 216 may be configured to detect an actual need from the processor 208 based on trends analysis and generate the request 220 based on the detected need. Moreover, a certain configuration of the computing system 200 may cause the memory controller 214 to generate the request 200, and this may be considered an event. For simplicity, the terminology "event" is utilized herein.

The request 220 may be for at least one of a deallocation of the memory space and/or the resource, a deallocation and an allocation of the memory space and/or the resource to the memory controller 214, or an allocation to the memory controller 214 of the memory space and/or the resource. The request 220 may be referred to as a memory and/or the resource capture request. The requested memory space may correspond with a buffer, a channel, a DRAM, a DIMM, a portion (sometimes referred to as a "chunk") of a bigger memory space, etc. The memory space may be a continuous memory space, a discontinuous memory space (e.g., a request for two gigabytes may result in two one-gigabyte memory spaces), etc. The requested resource may be practically any resource (or a portion thereof), such as a processor resource (or a portion thereof), an input-output resource (or a portion thereof), etc. The request 220 may be for a memory space and/or a resource to be used temporarily or a memory space and/or a resource to be used permanently. The request 220 may seek a memory space corresponding to a region of memory 212 with a size, non-cacheable, with a pinned address virtual memory management attribute, or any combination thereof.

Moreover, the request 220 may seek a general memory space, such as any memory space that may satisfy a requested quantity (e.g., any 4 k block or any physical address range of two gigabytes from the memory 212). Similarly, the request 220 may seek a general resource, such as any resource that may satisfy the request 220 (e.g., any of the processors 208, 210 or other processor resource that may satisfy a request for a processor resource, any of the DASDs 236, 248, 254, 255, the optical disk drives 242, 246, or other storage devices that may satisfy a request for an input-output resource, etc.).

On the other hand, the request 220 may seek a specific memory space with a particular location (e.g., a specific physical address or addresses, specific physical address region, etc. from the memory 212) and/or seek a specific resource (e.g., specifically seek the DASD 248 or specifically seek a portion of the DASD 248, etc.). Alternatively, the request 220 may seek a memory space with a particular attribute (e.g., a type, locality of reference, implied performance, speed, reliability, low power, non-volatility, etc.) and/or seek a resource with a particular attribute. For example, a memory controller may request one or more IO channels by attributes like specific transfer sizes, encryption method, etc., and processing may be performed using a memory space for streamed and encrypted data transfer over those channels. Thus, the request 220 may seek a specific memory space and/or a specific resource with particular attributes.

As an example, the type of the memory space may be a logical type relating to how data is logically structured, such as a request for a memory space that is compressed, a request for a memory space that is uncompressed, a request for a memory space that is used by a particular entity, a request for a memory space with a particular locality of reference, a request for a memory space with a particular process (or application), a request for a memory space of a particular operating system, and a request for a memory space of a particular hypervisor, etc. The type of the memory space may be a physical type relating to topography, such as a request for a memory space that is on a particular node, a request for a memory space on a particular drawer (e.g., as in symmetric multiprocessing ("SMP") or distributed system for optimal performance), etc. The physical type may also relate to technology, such as a request for a memory space that is non-volatile, a request for a memory space that is flash based, a request for a memory space that is I/O memory, a request for a memory space that is phase change memory ("PCM"), etc. The memory 212 may include a variety of types of memory (e.g., PCM may be mixed in with DRAM), and requests may be generated for the variety of types of memory. The request 220 may seek a memory space with other characteristics not listed herein.

The memory controller 214 may request a memory space of the memory 212 and/or a resource of any of the processors 208, 210, the DASDs 236, 248, 254, 255, the LAN adapters 244, 250, 252, the optical disk drives 242, 246, etc. from a computer program configured to make memory spaces and/or resources available (e.g., from any of the memory 212, the processors 208, 210, the DASDs 236, 248, 254, 255, the LAN adapters 244, 250, 252, the optical disk drives 242, 246, etc.) in response to requests for the memory spaces and/or the resources. The computer program may be the hypervisor 229 or other computer program. The memory controller 214 may communicate the request 220 through the MC device driver 297 that communicates with the hypervisor 229, as generally illustrated by the dashed line 213. The memory controller 214 may also be configured to receive at least one indication, such as an interrupt, related to the availability of the memory space and/or the resource in response to the request 220 via the MC device driver 297.

In particular, the hypervisor 229 may run the MC device driver 297 for the memory controller 214. The memory controller 214 may or may not communicate the request 220 for a memory space and/or a resource when the hypervisor 229 starts running the MC device driver 297. For instance, the memory controller 214 may simply indicate via the MC device driver 297 that it is a trusted a trusted device and that the MC device driver 297 is how the hypervisor 229 may communicate with the memory controller 214. The hypervisor 229 may understand the MC device driver 297, may map it into its resource pool, and may know that it and the memory controller 214 exist. The memory controller 214 may communicate the request 220 later in response to the event 218.

A MC memory space 223 is illustrated to represent the memory space indicated to be available for use by the memory controller 214 by the hypervisor 229 or other computer program. A MC resource 231 is illustrated to represent the resource indicated to be available for use by the memory controller 214 by the hypervisor 229 or other computer program. The MC memory space 223 may represent the DRAM from the memory 212 and/or the MC resource 231 may represent a processing resource, input-output resource, or other resource allocated to the memory controller 214 by the hypervisor 229 or other computer program. Although illustrated as a single box for simplicity, the MC memory space 223 may represent a plurality of memory spaces for use by the memory controller 214. Similarly, the MC resource 231 may represent a plurality of resources for use by the memory controller 214. As an example, the MC memory space 223 may represent fourteen different regions of the memory 212 and/or the MC resource 231 may represent fourteen resources that were allocated to the memory controller 214 in response to fourteen different requests 220 in response to fourteen different events 218. Although one request 220 is illustrated, a plurality of requests 220 may be generated.

The memory controller 214 may utilize the memory space and/or the resource represented by the MC memory space 223 and/or the MC resource 231 for at least one of testing, calibrating, tracing, caching, optimizing, computing, transforming, encrypting, decrypting, prefetching, paging, precoding, predecoding, compressing, decompressing, remapping (e.g., in association with fault tolerance), mirroring, shadowing, or as a scratch pad. The memory controller may use the memory space and/or the resource for at least one of upstream data processing or upstream data storage. The memory controller may use the memory space and/or the resource for at least one of downstream data processing or downstream data storage. For example, the memory controller 214 may use the MC memory space 223 and/or the MC resource 231 for prefetching as a prefetch buffer, for remapping as a redundant array, etc. Regarding remapping, the memory controller may intercept and service references to that memory space, as well as change the physical mapping at the DRAM level. As such, over a short period of time, a faulty memory space may be physically remapped by the memory controller 214 to a different memory space without a fault. Other uses may also be possible.

Furthermore, a portion of the MC memory space 223 may be utilized for bi-directional communication, as illustrated by dashed line 257, between the memory controller 214 and the hypervisor 229 (or other computer program). For instance, the MC memory space 223 may represent fourteen different regions of DRAM of the memory 212, and regions one through thirteen of the fourteen regions may be used for thirteen different purposes while region fourteen of the fourteen regions may be utilized for bi-directional communication. The hypervisor 229 may know through the MC device driver 297 that it should read the region fourteen of the fourteen regions of the MC memory space 223 for data from the memory controller 214 (e.g., status or state data, remapping data, etc.). Similarly, the memory controller 214 may read data from the hypervisor 229 (or other computer program) from the region fourteen of the fourteen regions of the MC memory space 223.

The memory controller 214 may include at least one register, such as registers 221, 222. For example, the memory controller 214 may include hundreds of registers, and registers 221, 222 may represent about 10 to about 20 more registers. The registers 221, 222 may be configured as arrays. The memory controller 214 may use at least one register 221 to register a memory space and/or a resource indicated to be available before using the memory space and/or the resource. Furthermore, the memory controller 214 may utilize at least one register 222 for bi-directional communication, as illustrated by dashed line 256, between the memory controller 214 and the hypervisor 229 (or other computer program). For example, the hypervisor 229 may know through the MC device driver 297 that it should read the register 222 for data from the memory controller 214 (e.g., status or state data, remapping data, etc.). Similarly, the memory controller 214 may read data from the hypervisor 229 (or other computer program) from the register 222.

The memory controller 214 may further include at least one exclusive memory space 224 that is under the control of the memory controller 214. The exclusive memory space 224 may be physically located within the memory controller 214, may correspond to an eDRAM, may be made out of registers, etc. The exclusive memory space 224 may be about 256 bytes, about 1000 bytes (i.e., about 1K), up to about 1000 bytes (i.e., up to about 1K), etc. For example, after the initialization period, the memory controller 214 may copy contents of practically any memory space, such as a specific memory space that it requested but that may be unavailable, into the exclusive memory space 224. Subsequently, the memory controller 214 may use the memory space that may be unavailable for at least one of testing, calibrating, tracing, caching, optimizing, computing, transforming, encrypting, decrypting, prefetching, paging, precoding, predecoding, compressing, decompressing, remapping, mirroring, shadowing, or as a scratch pad. During use of the unavailable memory space, the memory controller 214 may intercept any request to the memory space that may be unavailable, service the request from the exclusive memory space 224, and copy back the corresponding contents from the exclusive memory space 224 to the memory space that may be unavailable after the use ends.

The memory controller 214 may copy practically any memory space (not just a memory space that may be unavailable) into the exclusive memory space 224, use that memory space, intercept any request to that memory space, service the request, and copy back contents from the exclusive memory space 224 to that memory space after the use ends.

Alternatively or additionally, a tool 226 may monitor at least one event 228, and may generate a request for a memory space and/or a resource for the memory controller 214 after the initialization period. The tool 226 may generate the request in response to the event 228. The tool 226 may be implemented in firmware or may be associated with a BIOS of the computing system 200. The event 228 may be a memory controller timer event, a performance event, a maintenance event, a repair event, a memory debug event, a memory analysis event, an error event, or any combination thereof. After generating the request, the tool 226 may pass the request on to the memory controller 214. The memory controller 214 may reverse map any address of the request from the tool 226 to a physical address, if necessary. The request received from the tool 226, with the reverse mapping or without, may become the request 220.

Alternatively or additionally, a first resource may monitor at least one event 228, and may generate a request for a memory space and/or a resource after the initialization period. The first resource (e.g., a processor resource (e.g., any of the CPUs 208, 210), an input-output resource (e.g., any of the DASDs 236, 248, 254, 255, the LAN adapters 244, 250, 252, the optical disk drives 242, 246, etc.), or other resource) may generate the request in response to the event 228. Again, the event 228 may be a memory controller timer event, a performance event, a maintenance event, a repair event, a memory debug event, a memory analysis event, an error event, or any combination thereof. The request that is generated by the first resource may be for at least one of a deallocation of the memory space and/or the resource, a deallocation and an allocation of the memory space and/or the resource to the first resource, or an allocation to the first resource of the memory space and/or the resource.

After generating the request, the first resource may communicate the request to the memory controller 214 via a bus 230. For example, the DASD 236 may be connected to the bus 230 by line 227 and the memory controller 214 may be connected to the bus 230 by a line 215 (discussed further hereinbelow). The DASD 236 may generate and communicate the request via the line 227, the bus 230, and the line 215 to the memory controller 214. The memory controller 214 may reverse map any address of the request from the DASD 236 to a physical address, if necessary, or perform any other actions. The request received by the memory controller 214 from the DASD 236, with the reverse mapping or without, may become the request 220 that the memory controller 214 communicates to the hypervisor 229 (or other computer program).

Of note, the memory controller 214 may also communicate indications to the DASD 236 via line 215, the bus 230, and the line 227. Likewise, the hypervisor 229 or other computer program may communicate indications to the DASD 236 via the bus 230 and line 227. A DASD memory space 298 is illustrated to represent the memory space indicated to be available for use by the DASD 236 by the hypervisor 229 or other computer program. A DASD resource 299 is illustrated to represent the resource indicated to be available for use by the DASD 236 by the hypervisor 229 or other computer program.

As another example, the processor 208 may be connected to the bus 230 by line 209 and the memory controller 214 may be connected to the bus 230 by the line 215. The processor 208 may generate and communicate the request via the line 209, the bus 230, the line 215 to the memory controller 214. The request received by the memory controller 214 from the processor 208, with the reverse mapping or without, may become the request 220 that the memory controller 214 communicates to the hypervisor 229 (or other computer program).

Of note, the memory controller 214 may also communicate indications to the processor 208 via line 215, the bus 230, and the line 209. Likewise, the hypervisor 229 or other computer program may communicate indications to the processor 208 via the bus 230 and line 209. Boxes similar to DASD memory space 298 and DASD resource 299 may be illustrated in processor 208 to represent a memory space and/or a resource indicated to be available for use by the processor 208 by the hypervisor 229 or other computer program.

Alternatively, the request received by the memory controller 214 from the DASD 236 or the processor 208 may lead the memory controller 214 to generate at least one other request (e.g., a request X) and the request X may be the request 220 that is communicated by the memory controller 214 to the hypervisor 229 (or other computer program). Thus, the memory controller 214 may communicate substantially the same request received by the memory controller 214 from the first resource, a modified request, or a new request on behalf of the first resource for a memory space and/or resource to the hypervisor 229 (or other computer program).

The request 220, generated by the memory controller 214, generated and received from the tool 226, or generated and received from the first resource, may be communicated to the hypervisor 229 through the MC device driver 297 via the bus 230, such as a power bus.

To elaborate on communications between the memory controller 214 and the hypervisor 220 (or other computer program), the memory controller 214 may communicate through the MC device driver 297 that communicates with the hypervisor 229, as generally illustrated by the dashed line 213. The memory controller 214 may communicate up a pipeline to the MC device driver 297 that communicates with the hypervisor 229. In addition to the MC device driver 297, the hypervisor 229 (or other computer program) and the memory controller 214 may engage in bi-directional communications via the MC memory space 223 and/or the register 222. Thus, the communication may be through a memory mapped register such as the register 222 and/or a memory location in DRAM such as the MC memory space 223 that is made available by the hypervisor 229 in response to the request 220. Communication may be interrupt driven or polling driven. If not much communication is expected, the communication may be interrupt driven. As polling may be faster, polling may be used if a lot of communication is expected.

For example, the memory controller 214 may implicitly or explicitly communicate to the hypervisor 229 how the memory space and/or the resource will be used, communicate any issue to be resolved regarding the memory space (e.g., faulty memory space) and/or the resource, etc. The hypervisor 229 (or other computer program) may monitor the progress of the memory controller 214 through polling of a pre-defined location (e.g., the MC memory space 223 and/or the register 222) for communications with the memory controller 214. The hypervisor 229 may receive data from the memory controller 214 and learn through polling, for example, status or state data (e.g., status of remapping, when remapping is complete, final remapping, etc.), what actions the memory controller 214 has completed, if anything is needed to continue, etc.

A variety of scenarios regarding communications are contemplated and disclosed herein. In a first scenario, the computer program, such as the hypervisor 229, configured to make memory spaces of the memory and/or resources available in response to requests for the memory spaces and/or the resources may not be aware of actions by the memory controller 214. For example, in a first scenario, the memory controller 214 may copy a memory space into the exclusive memory space 224, use that memory space, intercept any request to that memory space, service the request, and copy back contents from the exclusive memory space 224 to that memory space after the use ends. Similarly, under the first scenario, the memory controller 214 may simply use a resource that is made available for decrypting or upstream data storage, etc. In this first scenario, the computer program may not even know that these actions occurred.

In a second scenario, the computer program may know that the memory controller 214 took the memory space and/or the resource (e.g., because the computer program received the request 220 and allocated the memory space and/or the resource to the memory controller 214 in response to the request 220), but may not know why the memory controller 214 took the memory space and/or the resource. For example, the memory controller 214 may take the memory space and/or the resource made available for its use (illustrated as the MC memory space 223 and/or the MC resource 231), use it under the covers for decrypting, prefetching, etc., and release the memory space and/or the resource without communicating why it took the memory space and/or the resource.

In a third scenario, the computer program may know that the memory controller 214 took the memory space and/or the resource, may also know why the memory space and/or the resource was taken (e.g., a fault was detected), and may collaborate with the memory controller 214 regarding the reason the memory space and/or the resource was taken. Moreover, in this third scenario, the computer program may allow the memory controller 214 to continue to take that memory space and/or the resource in support of the computing system 200.

As an example of this third scenario, the memory controller 214 may utilize the MC memory space 223 for remapping, such as in association with fault tolerance or a failure mode where a section (e.g., a 4K block) of the memory 212 may be faulty (e.g., an ECC error or failing above a threshold). The memory controller 214 may dynamically remap and move contents from one faulty physical location of the memory 212 to a different physical location of the memory 212 that is not faulty. In particular, the memory controller 214 may request by the request 220 and get allocated via the MC device driver 297 two memory spaces of the memory 212 by the hypervisor 229 (or other computer program), namely, a 4 k faulty memory space and a 4 k non-faulty memory space (i.e., the MC memory space 223 in this example). The memory controller 214 may have identified the 4 k faulty memory space through the event 218. The memory controller 214 may copy the contents of the faulty memory space to the non-faulty memory space, physically remap the faulty memory space to the non-faulty memory space, and intercept and service references to the faulty memory space from the non-faulty memory space as necessary. The memory controller 214 may also use the MC resource 231 for the remapping. The memory controller 214 may communicate to the hypervisor 229 (or other computer program) status or state data during the remapping process as well as the final remapping via the MC memory space 223 and/or the register 222. As a result, the memory controller 214 may move the contents of the 4 k faulty memory space to another physical location of the memory 212 and may inform the hypervisor 229 that the configuration has changed and operations should utilize the new configuration. The hypervisor 229 (or other computer program) may manage the computing system 200 with the new configuration, including using the final remapping and refraining from allocating the 4 k faulty memory space any further.

The memory controller 214 may be able to physically remap a memory space while that memory space is being used (e.g., by an application). A particular application may continue to run in the presence of a faulty memory space as the memory controller 214 has moved the data content to a different memory space. The memory controller 214 may intercept and service references of the application to that faulty memory space while changing the physical mapping at the DRAM level, such that over a short period of time, the memory controller 214 may migrate the content of the faulty memory space to a different memory space with no fault. In other words, the memory controller 214 may perform a remapping that may be considered a second level remapping underneath virtual memory management (e.g., underneath the page table level and translation lookaside buffer level). Moreover, while the memory controller 214 and the hypervisor 229 (or other computer program) may engage in bi-directional communication through the MC memory space 223 and/or the register 222, the remapping may occur without any direct intervention by the hypervisor 229 (or other computer program). The hypervisor 229 (or other computer program) may simply learn about the status, but may not have to perform any actions to assist the memory controller 214 with the remapping.

The memory controller 214 may also have a connection (e.g., a hardware wire) to the bus 230, illustrated as the line 215, to inform the memory controller 214 of an indication from the hypervisor 229 or other computer program. The connection may avoid continuous polling to determine if there is an indication. For example, the hypervisor 229 or other computer program may interrupt the memory controller 214, via the wire illustrated as the line 215, to indicate that something (e.g., an indication) is available for the memory controller 214 and the memory controller 214 should look.

Furthermore, in some embodiments, a device driver (e.g., the MC device driver 297) and/or a virtual device driver (e.g., OS virtual device drivers 285, 286, 287 discussed further hereinbelow) may not be used to communicate with a computer program. For example, another embodiment may use interrupts and/or polling (or some other mailbox protocol) directly to the hypervisor 229 (or other computer program) instead of the MC device driver 297. This integrated design may avoid the MC driver 297, but may not be portable to other hypervisors.

Thus, consistent with the embodiments disclosed herein, a memory controller may communicate with a computer program through a device driver. A memory controller may communicate with a computer program through a virtual device driver. A memory controller may communicate with a computer program through interrupts. A memory controller may communicate with a computer program through polling. A memory controller may communicate with a computer program through both polling and interrupts. A memory controller may communicate with a computer program in a unidirectional manner (e.g., the memory controller 214 sends the request 220 to the hypervisor 229 for the memory space and/or the resource). A memory controller may utilize at least one register for bi-directional communication with the computer program. A memory controller may utilize a memory space available for use by the memory controller (e.g., illustrated as the MC memory space 223) for bi-directional communication with a computer program. A memory controller may utilize both at least one register and a memory space available for use by the memory controller for bi-directional communication with a computer program. Communication may also occur through a bus (e.g., a power bus). Moreover, although a hypervisor is illustrated, some embodiments may not even include a hypervisor, and a memory controller may simply communicate with which ever computer program is configured to make memory resources and/or resources available for use in response to requests. The memory controller 214 may also request a memory space and/or a resource for its own use or on behalf of a first resource.

Returning to the hypervisor 229, the hypervisor 229 may be called a partition manager or a virtualization manager and may be configured to create each of the partitions 202, 204, 206 and allocate and adjust resources (e.g., memory resources, processor or CPU resources, or other resources) to each of the partitions 202, 204, 206 (e.g, after the initialization period), including configured to make memory spaces of the memory 212 and/or the resources available in response to requests for the memory spaces and/or the resources. In addition to this functionality, the hypervisor 229 may also be configured to process the request 220 for the memory space and/or the resource from the memory controller 214 (e.g., after the initialization period) communicated via the MC device driver 297. The hypervisor 229 may be configured to run the MC device driver 297, as well as run other device drivers 272, 298 associated with other hardware. The processors 208, 210 may be configured to execute program code to execute the hypervisor 229, such as hypervisor 273 meant to illustrate program code of the hypervisor 229.

The logical partitions 202, 204, 206 may each use a portion of the processors 208, 210, the memory 212, and/or other resources (e.g., the DASD 236, a control panel 238, a tape drive 240, and/or the optical disk 242) of the computing system 200. For example, when the partitions 202, 204, 206 within the computing system 200 are sharing the processors 208, 210, the hypervisor 229 may allocate physical processor cycles between virtual processors 261-266 of the partitions 202, 204, 206 sharing the processors 208, 210. The processors 208, 210 may execute software configured to simulate one or more of the virtual processors 261-266 in one or more logical partitions 202, 204, 206. As another example, when the partitions 202, 204, 206 within the computing system 200 are sharing the memory 212, the hypervisor 229 may allocate memory spaces of the memory 212 as necessary between the logical memories of the partitions 202, 204, 206 sharing the memory 212. Furthermore, other resources, e.g., mass storage, backup storage, user input, network connections, and the like, may be allocated to the logical partitions 202, 204, 206. The resources may be allocated in a number of manners, e.g., on a bus-by-bus basis, or on a resource-by-resource basis, with multiple logical partitions 202, 204, 206 sharing resources on the same bus. Some resources may also be allocated to multiple logical partitions at a time.

For example, FIG. 2 illustrates three logical buses 230, 232, 234. Turning to the bus 230, each of the processors 208, 210 and the memory controller 214 may be connected to the bus 230. The bus 230 is additionally illustrated with a plurality of resources, including the DASD 236, the control panel 238, the tape drive 240, and the optical disk drive 242. The resources may be allocated on a shared basis among logical partitions 202, 204, 206. Bus 232, however, may have resources allocated on a resource-by-resource basis, e.g., with the LAN adapter 244, the optical disk drive 246, and the DASD 248 allocated to the logical partition 202, and the LAN adapters 250 and 252 allocated to the logical partition 204. The bus 234 may represent a bus allocated specifically to logical partition 206, such that all resources on the bus, e.g., the DASDs 254, 255 are allocated to the same logical partition.

Each partition 202, 204, 206 may also host a respective operating environment, or operating systems 258, 259, 260. The processors 208, 210 may be configured to execute program code to execute the operating systems 258, 259, 260. Each operating system 258, 259, 260 controls the primary operations of its respective logical partition 202, 204, 206 in a manner similar to the operating system of a non-partitioned computer. Each logical partition 202, 204, 206 may be a member of the same, or a different, distributed computing environment. Each operating system 258, 259, 260 may execute in or be associated with separate logical memories, respectively illustrated as OS memory spaces 267, 268, 269. Each logical partition 202, 204, 206 may share the processors 208, 210 by sharing a percentage of processor resources for use by the virtual processors 261-266, as well as a portion of the memory 212 for use in the OS memory spaces 267-269. In this manner, the resources of a given processor 208, 210 and a given memory 212 may be utilized by more than one logical partition 202, 204, 206. In similar manners, the other resources available to computing system 200 may be utilized by more than one logical partition 202, 204, 206. After being configured with processor, memory, other resources, and the operating systems 258, 259, 260, each logical partition 202, 204, 206 may operate as if it were a separate computer.

The operating systems 258, 260, 262 may include a variety of applications (not shown) or processes (not shown), similar to the process 152, 154 of FIGS. 1A-1C. In one embodiment, the application may be a middleware application that connects applications, processes, and/or software components. The application may consist of a set of enabling services that allow multiple processes running on one or more logical partitions of one or more computers to interact. As such, the application may be a distributed application configured across multiple logical partitions (i.e., as shown in FIG. 2, across logical partitions 202, 204, 206) of one or more computers (i.e., as shown in FIG. 2, application is configured across computing system 200) as part of a distributed computing environment. One such distributed computing environment is a WebSphere architecture, as developed by IBM, such that a business may set up, operate, and integrate network-based websites, applications, or businesses across one or more computing systems.

Returning to the hypervisor 229, to allocate and adjust resources to each partition 202, 204, 206, the hypervisor 229 may intercept requests for resources from the operating systems 258, 259, 260 or processes (e.g., applications) configured thereon (e.g., after the initialization period). The hypervisor 229 may include a dispatcher 270 that manages the dispatching of virtual resources to physical resources on a dispatch list, or a ready queue 271. The ready queue 271 may comprise memory that includes a list of virtual resources having work that is waiting to be dispatched to a resource of computing system 200. The hypervisor 229 may include other elements as well, for example, its own firmware, a compatibility table, control blocks, etc. A logical partition may use either or both the firmware of the partition 202, 204, 206 and the hypervisor 229.

As an example, after the initialization period, the hypervisor 229 may have control over all or less than all of the memory 212 that was initialized by, but no longer controlled by, the memory controller 214 that is illustrated as a hypervisor memory space 275. Similarly, after the initialization period, the hypervisor 229 may have control over all or less than all of the other resources, including the processors 208, 210, the DASDs 236, 248, 254, 255, etc. (as illustrated by a hypervisor resource 233). The hypervisor 229 may allocate memory spaces of the hypervisor memory space 275 to the operating systems 258, 259, 260 for the OS memory spaces 267, 268, 269 as requests for memory resources are intercepted from the operating systems 258, 259, 260. Similarly, the hypervisor 229 may allocate resources of the hypervisor resource 233 to the operating systems 258, 259, 260 for OS resources 235, 237, 239 as requests for resources are intercepted from the operating systems 258, 259, 260. Allocations (e.g., of the hypervisor memory space 275 and/or the hypervisor resource 233 to the operating system 258 and OS memory space 267 thereof) may be tracked in a table 278.

In addition to allocating and adjusting resources to each partition 202, 204, 206 after the initialization period, at least one of the hypervisor 273, the MC device driver 297, or the hypervisor interrupt handler 274 may be utilized to process the request 220 depending on the particular embodiment. For example, in addition to actions mentioned in connection with FIGS. 1A-1C, processing the request 220 may include picking up at least one packet associated with the request 220, determining from the request 220 if a specific memory space, a general memory space, a specific resource, and/or a general resource is sought, determining whether to wait for a specific memory space and/or a specific resource, and/or translations.

Regarding translations, at least one page table 277 may be utilized to translate a physical address into a logical address or virtual page, as necessary. The memory controller 214 may understand physical addresses, while the hypervisor 229 (and each of the operating system 258, 259, 260 and process 279, 280, 281) may understand logical addresses. As such, physical to logical and/or logical to physical translations may be utilized to process the request 220. The page table 277 may be software maintained in memory by the hypervisor 229, may be megabytes big in size, and may map out all of the pages potentially in the computing system 200. At least one of the hypervisor 273, the MC device driver 297, or the hypervisor interrupt handler 274 may utilize the page table 277 to determine which page or pages correspond to the physical address or addresses that are sought by the request 220. After the translation, the table 278 may be checked to determine if the logical address (or page) corresponding to the physical address of the request 220, for example, has been allocated to an entity (e.g., allocated to one of the operating systems 258, 259, 260). In some embodiments, the page table 277 may be utilized for translations as well as tracking deallocations and/or allocations. Similarly, the table 278 may be checked to determine which resources have already been allocated to an entity (e.g., allocated to one of the operating systems 258, 259, 260). For example, the table 278 may be checked to determine which resource identifiers are allocated and which are not.

When the memory space and/or the resource are available from the hypervisor memory space 275 and/or the hypervisor resource 233, the memory space and/or the resource may be deallocated and/or allocated as necessary and made available for use by the memory controller 214 or by the first resource. For example, in addition to actions mentioned in connection with the FIGS. 1A-1C, at least one of the hypervisor 273, the MC device driver 297, or the hypervisor interrupt handler 274 may deallocate the memory space and/or the resource by moving any affected data, saving any affected data, modifying the table 278 (and/or the page table 277) to reflect the deallocation (e.g., after saving the affected data), modifying the table 278 (and/or the page table 277) to reflect the allocation, saving any modified tables, or any combination thereof. The memory space and/or the resource may be allocated to the memory controller 214 or to the first resource based upon the request 220.

When the memory space and/or the resource are available, an indication, such as an acknowledgement packet (ACK packet), may be communicated to the memory controller 214 after the data save actions have completed by at least one of the hypervisor 273, the MC device driver 297, or the hypervisor interrupt handler 274. The indication may include physical address or addresses of the memory 212 corresponding to the available memory space, information corresponding to the available resource (e.g., an identifier of the available resource), and may include the entity providing the memory space and/or the resource, such as the hypervisor 229. The memory controller 214 may detect an interrupt corresponding to the ACK packet, read the ACK packet, register the memory space and/or the resource that is available at the register 221 before use by the memory controller 214, and the memory controller 214 may use the memory space and/or the resource that it has registered. If the request 220 was received from the tool 226, the memory controller 214 may also report to the tool 226, for example, that the deallocation is done.

If the request 220 was received from the first resource, the memory controller 214 may communicate an indication (e.g., another ACK packet) to the first resource that the memory space and/or the resource are available in response to the indication from the hypervisor 229 that the memory space and/or the resource are available. The indication that is communicated from the memory controller 214 to the first resource may be substantially the same indication communicated from the hypervisor 229 to the memory controller 214, a modified indication, or a new indication. As an example, the indication that is communicated from the memory controller 214 to the first resource may include physical address or addresses of the memory 212 corresponding to the available memory space, information corresponding to the available resource (e.g., an identifier of the available resource), and may include the entity providing the memory space and/or the resource, such as the hypervisor 229. The first resource may detect an interrupt corresponding to the ACK packet, read the ACK packet, register the memory space and/or the resource that is available before use by the first resource, and the first resource may use the memory space and/or the resource that it has registered. As the register 221 may be part of the memory controller 214, the first resource may request that the memory controller 214 perform the registration. Alternatively, the first resource may register the memory space and/or resource with a different register, similar to the register 221, or other storage area that is not part of the memory controller 214 but that is accessible to the hypervisor 229 or other computer program.

When the memory space and/or the resource is not available from the hypervisor memory space 275 and/or the hypervisor resource 233, at least one of the hypervisor 273, the MC device driver 297, or the hypervisor interrupt handler 274 may determine whether the memory space and/or the resource are available from the operating systems 258, 259, 260 and their respective OS memory spaces 267, 268, 269 and/or OS resources 235, 237, 239 by checking the table 278 (and/or the page table 277). Specifically, any memory space and/or resource made available to (e.g., allocated to) the operating systems 258, 259, 260, and reflected in their respective OS memory spaces 267, 268, 269 and/or OS resources 235, 237, 239, may be tracked in the table 278 (and/or the page table 277). Additionally, allocation of memory spaces and/or resources to processes 279, 280, 281 by the operating systems 258, 259, 260, illustrated as process memory spaces 282, 283, 284 and/or process resources 241, 243, 245, may also be tracked in the table 278 (and/or the page table 277). As such, the table 278 (and/or the page table 277) may be checked to determine if the memory space and/or the resource are available from any one of the processes 279, 280, 281.

At least one of the hypervisor 273, the MC device driver 297, or the hypervisor interrupt handler 274 may communicate an indication to the memory controller 214 that the memory space and/or the resource is not available from the hypervisor 229, an indication that the memory space and/or the resource are available from one of the operating system 258, 259, 260, an indication that the memory space and/or the resource are available from one of the processes 279, 280, 281, or any combination thereof consistent with the determination. The memory controller 214 may communicate the request 220 for the memory space and/or resource to one of OS virtual device drivers 285, 286, 287 that communicate respectively with the operating systems 258, 259, 260 in response to the indication. For example, the indication from the hypervisor 229 may indicate that the memory space and/or the resource may be available from the operating system 258, and the request 220 may be communicated to the OS virtual device driver 285 that communicates with the operating system 258. The processors 208, 210 may be configured to execute program code to execute the operating systems 258, 259, 260.

At least one of the OS virtual device drivers 285, 286, 287, OS's 288, 289, 290 (e.g., meant to illustrate program code of the operating systems 258, 259, 260 respectively), OS interrupt handlers 291, 292, 293 may receive and process the request 220. For example, the OS virtual device drivers 285, 286, 287 may be dedicated and primarily responsible for receiving and processing requests for memory spaces and/or resources from the memory controller 214. The OS virtual device drivers 285, 286, 287 may be similar to the OS virtual device driver 136 of the FIGS. 1A-1C.

Virtual device drivers may be utilized depending on the configuration of the system. For example, virtual device drivers may be utilized in a virtual environment when there is a hypervisor and operating system instances, as in the computing system 200. If a hypervisor is not present in a system, for example, an operating system may directly connect to a device driver (e.g., the MC device driver 297) to communicate with a memory controller. However, when a hypervisor is present, as in the computing system 200, the hypervisor may first run a device driver (e.g., the MC device driver 297) and operating system instances may run on top of the hypervisor. An operating system instance may use a virtual device driver (e.g., OS virtual device driver 285) that behaves like it was the device driver (e.g., the MC device driver 297), but the virtual device driver may be almost a pipeline or cut through to the "real" device driver (e.g., the MC device driver 297) run by the hypervisor.

Nonetheless, processing the request 220 may include picking up at least one packet associated with the request 220 and determining if the memory space and/or the resource are available from the OS memory spaces 267, 268, 269 and/or the OS resources 235, 237, 239. For example, to determine if the memory space and/or the resource are available, tables 294, 295, 296 may be checked to determine if the logical address corresponding to physical address of the request 220, for example, has been allocated to an application and therefore may not be available, or if the logical address and/or the resource has been returned by the application and therefore may likely be available. If not allocated, then the memory space and/or the resource may be deallocated and/or allocated and available for use (e.g., by the memory controller 214 or the first resource) from the operating systems 258, 259, 260 accordingly. The memory space and/or the resource may be allocated to the memory controller 214 or to the first resource based upon the request 220.

For example, in addition to actions mentioned in connection with the FIGS. 1A-1C, at least one of the OS virtual device drivers 285, 286, 287, the OS's 288, 289, 290, the OS interrupt handlers 291, 292, 293 may deallocate the memory space and/or the resource by moving any affected data, saving any affected data, modifying the tables 294, 295, 296, saving any modified tables or any combination thereof. The page table 277 and/or the table 278 may also be modified and saved to reflect the changes. An indication (e.g., ACK) may be sent to the memory controller 214 that the memory space and/or the resource are available from the operating systems 258, 259, 260 along with physical address or addresses of the memory 212 corresponding to the available memory space, information corresponding to the available resource (e.g., an identifier of the available resource), an indication that the memory space and/or the resource is not available from the operating systems 258, 259, 260, or any combination thereof consistent with the determination. The page table 277 and/or hypervisor 229 may be consulted for the physical address or addresses.

The memory controller 214 may detect an interrupt corresponding to the ACK packet from the operating systems 258, 259, 260, read the ACK packet, register the memory space and/or the resource that is available at the register 221 before use by the memory controller 214, and the memory controller 214 may use the memory space and/or the resource that it has registered. If the request 220 was received from the tool 226, the memory controller 214 may also report to the tool 226 that the deallocation is done.

If the request 220 was received from the first resource, the memory controller 214 may communicate an indication (e.g., another ACK packet) to the first resource that the memory space and/or the resource are available in response to the indication from the operating systems 258, 259, 260 that the memory space and/or the resource are available. The indication that is communicated from the memory controller 214 to the first resource may be substantially the same indication communicated from the operating systems 258, 259, 260 to the memory controller 214, a modified indication, or a new indication. As an example, the indication that is communicated from the memory controller 214 to the first resource may include physical address or addresses of the memory 212 corresponding to the available memory space, information corresponding to the available resource (e.g., an identifier of the available resource), and may include the entity providing the memory space and/or the resource, such as one of the operating systems 258, 259, 260. The first resource may detect an interrupt corresponding to the ACK packet, read the ACK packet, register the memory space and/or the resource that is available before use by the first resource, and the first resource may use the memory space and/or the resource that it has registered. As the register 221 may be part of the memory controller 214, the first resource may request that the memory controller 214 perform the registration. Alternatively, the first resource may register the memory space and/or resource with a different register, similar to the register 221, or other storage area that is not part of the memory controller 214 but that is accessible to the hypervisor 229 or other computer program.

Alternatively, the memory controller 214 may communicate the request 220 for the memory space and/or the resource to one of the processes 279, 280, 281 in response to the indication. Each of the processes 279, 280, 281 may be created and dedicated to handle requests for memory spaces and/or resources from the memory controller 214 (e.g., for its own use or on behalf of the first resource). The processors 208, 210 may be configured to execute program code to execute the processes 279, 280, 281.

Process memory spaces 282, 283, 284 are meant to illustrate the memory spaces of the processes 279, 280, 281, respectively. Process resources 241, 243, 245 are meant to illustrate the resources of the processes 279, 280, 281, respectively. The processes 279, 280, 281 may already have allocated memory spaces and/or allocated resources from the operating systems 258, 259, 260, and the allocation was reflected in the table 278 of the hypervisor 229. However, the processes 279, 280, 281 may not, and therefore may request the memory space and/or the resource from the operating systems 258, 259, 260, respectively. The process 279, 280, 281 may determine if the memory space and/or the resource is allocated by the operating systems 258, 259, 260, respectively.

For example, as described above, the hypervisor 229 may allocate from the hypervisor memory space 275 and/or the hypervisor resource 233 to the operating systems 258, 259, 260 for the OS memory spaces 267, 268, 269 and/or the OS resources 235, 237, 239 as requests for resources are intercepted from the operating systems 258, 259, 260. Similarly, the operating systems 258, 259, 260 may allocate from the OS memory spaces 267, 268, 269 and/or the OS resources 235, 237, 239 to the processes 279, 280, 281 for the process memory spaces 282, 283, 284 and/or the process resources 241, 243, 245. Allocations to the processes 279, 280, 281 may be tracked in the tables 294, 295, 296 of the operating systems 258, 259, 260, respectively. The page table 277 and/or the table 278 may also be modified and saved to reflect the changes. For example, changes to the tables 294, 295, 296 may be sent to the hypervisor 229 to update the table 278 and/or the page table 277 accordingly. The processes 279, 280, 281 may receive an indication from the operating systems 258, 259, 260 as to whether the memory space and/or the resource are available along with the logical address or addresses of the memory space, identifier of the resource, etc. The memory space and/or the resource may be allocated to the memory controller 214 or to the first resource based upon the request 220.

Moreover, an indication (e.g., ACK) may be sent to the memory controller 214 that the memory space and/or the resource are available from the processes 279, 280, 281 along with physical address or addresses of the memory 212 corresponding to the available memory space, information corresponding to the available resource (e.g., an identifier of the available resource), an indication that the memory space and/or the resource is not available from the processes 279, 280, 281, or any combination thereof consistent with the determination. The page table 277 and/or hypervisor 229 may be consulted for the physical address or addresses.

The memory controller 214 may detect an interrupt corresponding to the ACK packet from the processes 279, 280, 281, read the ACK packet, register the memory space and/or the resource that is available at the register 221 before use by the memory controller 214, and the memory controller 214 may use the memory space and/or the resource that it has registered. If the request 220 was received from the tool 226, the memory controller 214 may also report to the tool 226, for example, that the deallocation is done.

If the request 220 was received from the first resource, the memory controller 214 may communicate an indication (e.g., another ACK packet) to the first resource that the memory space and/or the resource are available in response to the indication from the processes 279, 280, 281 that the memory space and/or the resource are available. The indication that is communicated from the memory controller 214 to the first resource may be substantially the same indication communicated from the processes 279, 280, 281 to the memory controller 214, a modified indication, or a new indication. As an example, the indication that is communicated from the memory controller 214 to the first resource may include physical address or addresses of the memory 212 corresponding to the available memory space, information corresponding to the available resource (e.g., an identifier of the available resource), and may include the entity providing the memory space and/or the resource, such as one of the processes 279, 280, 281. The first resource may detect an interrupt corresponding to the ACK packet, read the ACK packet, register the memory space and/or the resource that is available before use by the first resource, and the first resource may use the memory space and/or the resource that it has registered. As the register 221 may be part of the memory controller 214, the first resource may request that the memory controller 214 perform the registration. Alternatively, the first resource may register the memory space and/or resource with a different register, similar to the register 221, or other storage area that is not part of the memory controller 214, but that is accessible to the hypervisor 229 or other computer program.

Figure 3:
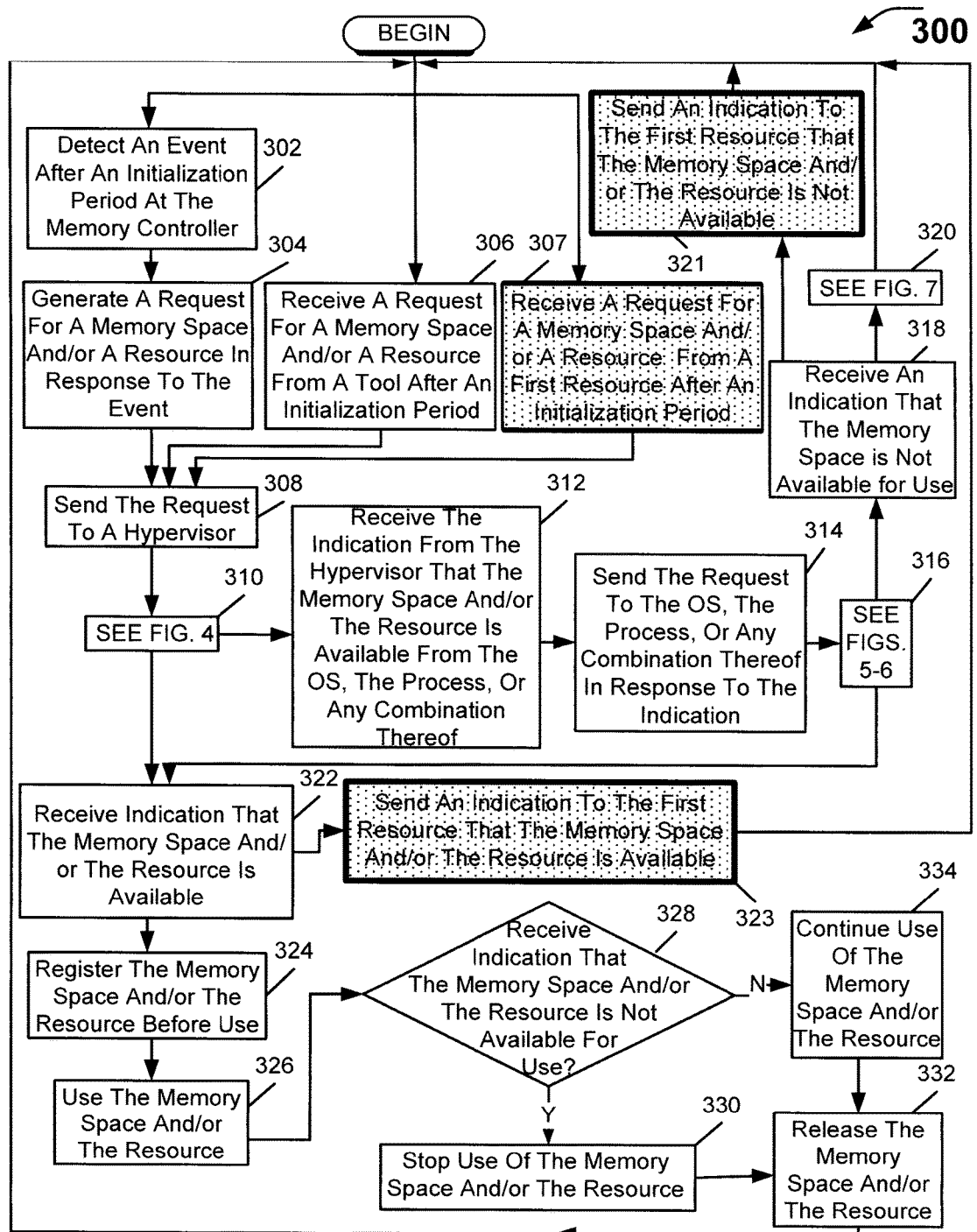
FIG. 3 is a flowchart of an embodiment of a first method of requesting a memory space and/or a resource by a memory controller that may be executed by the computing systems of FIGS. 1A-2.

FIG. 3 illustrates an embodiment of a first method 300 of requesting a memory space and/or a resource by a memory controller (e.g., after an initialization period) that may be executed by the apparatus 100 of FIGS. 1A-1C and/or the computing system 200 of FIG. 2. The method 300 may also be considered an embodiment of requesting a memory space and/or a resource (e.g., by a first resource) using a memory controller (e.g., after an initialization period) that may be executed by the apparatus 100 of FIGS. 1A-1C and/or the computing system 200 of FIG. 2. In particular, the method 300 may be executed by a memory controller such as the memory controller 114 of FIGS. 1A-1C and/or the memory controller 214 of FIG. 2. The method 300 will reference items from FIG. 2.

At 302, the memory controller may detect an event after an initialization period at the memory controller. The memory controller may generate a request for a memory space and/or a resource in response to the event, at 304. For example, the memory controller 214 may be configured to detect the event 218 and generate the request 220 in response to the event 218.

Alternatively, at 306, the memory controller may receive a request from a tool after an initialization period. For example, the tool 226 may monitor the event 228 and generate the request for the memory space and/or the resource in response to the event 228. After generating the request, the tool 226 may pass the request on to the memory controller 214.

Figure 8:
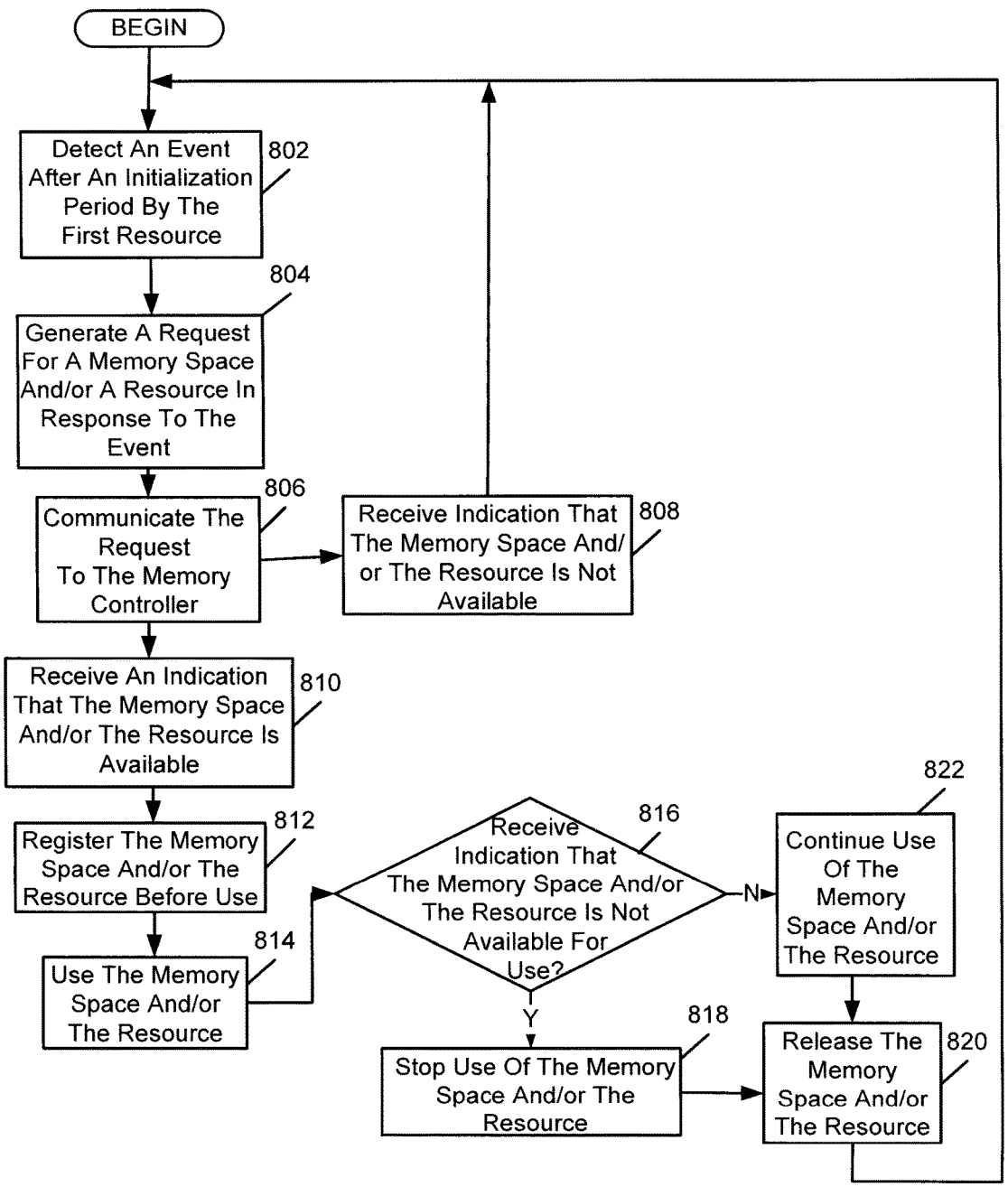
FIG. 8 is a flowchart of an embodiment of a first method of requesting a memory space and/or a resource by a first resource (e.g., a processor resource or an input-output resource) using a memory controller that may be executed by the computing systems of FIGS. 1A-2.

Alternatively, at 307, the memory controller may receive a request from a first resource (e.g., a processor resource or an input-output resource) after an initialization period. For example, the DASD 236 may monitor the event 228 and generate the request for the memory space and/or the resource in response to the event 228. As another example, the processor 208 may generate the request for the memory space and/or the resource for some other reason. After generating the request, the first resource may communicate the request to the memory controller 214. Items 307, 321, 323 are illustrated in bold and in shading to indicate that these blocks are related. In particular, 321, 323 (discussed further below) represent indications that may be communicated from the memory controller 214 to the first resource responsive to the request received at 307 from the first resource. The request may be communicated by the first resource to the memory controller 214 via a method 800 of FIG. 8. The first resource may also respond to indications from the memory controller as described in the method 800 of FIG. 8. FIG. 8 will be discussed further hereinbelow.

Figure 4:
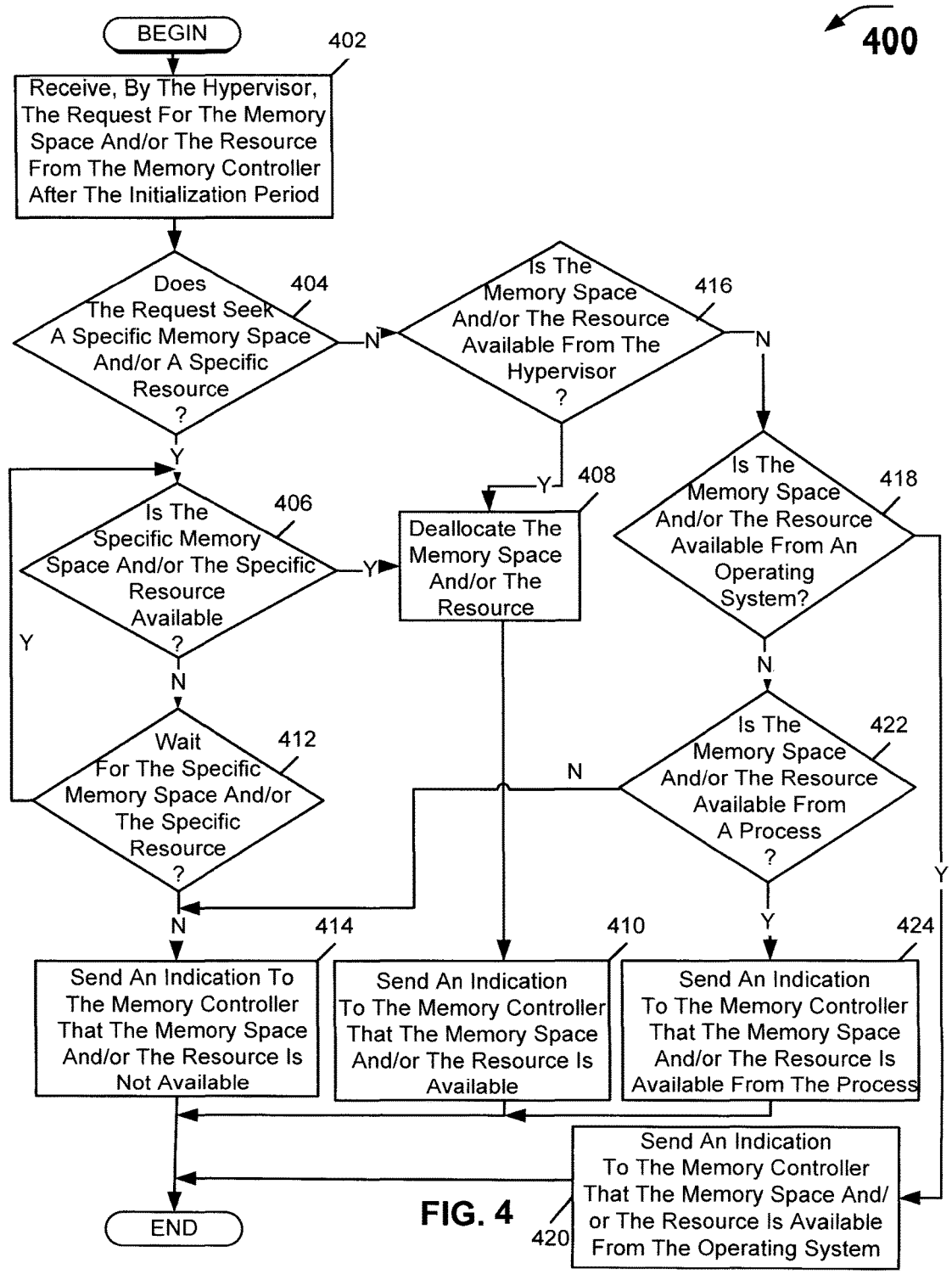
FIG. 4 is a flowchart of an embodiment of a first method of processing a request for a memory space and/or a resource from a memory controller by a hypervisor that may be executed by the computing systems of FIGS. 1A-2.

The memory controller may send the request to a hypervisor, at 308, and the method may pass to FIG. 4, at 310. For example, the memory controller 214 may send the request 220, generated by the memory controller 214, received from the tool 226, or received from the first resource, to the hypervisor 229. The request 220 may be made and granted for exclusive use of a memory space and/or a resource.

Turning to FIG. 4, an embodiment of a first method 400 of processing a request for a memory space and/or a resource (e.g., from a memory controller for its own use or on behalf of the first resource that may be communicated after an initialization period) by a hypervisor is shown. The method 400 may be executed by the apparatus 100 of FIGS. 1A-1C and/or the computing system 200 of FIG. 2. In particular, the method 400 may be executed by the hypervisor 126 of FIGS. 1A-1C and/or the hypervisor 229 of FIG. 2. The method 400 will reference items from FIG. 2.

At 402, the hypervisor may receive the request for the memory space and/or the resource from the memory controller after the initialization period. At 404, the hypervisor may determine if the request seeks a specific memory space and/or a specific resource. For example, the hypervisor 229 may receive the request 220 from the memory controller 214 and determine if the request 220 seeks a specific memory space by determining if the request 220 seeks a specific physical address of the memory 212 and/or seeks a specific resource by determining if the request 220 includes a resource identifier (e.g., a media control address (MAC address) or some other identifier). For example, a memory controller may seek specific one or more dedicated logical CPU processor threads and a dedicated memory space specified by a memory size (e.g., from a hypervisor or other computer program) in order to process iterative algorithms that are both processor and memory intensive. By doing so, computing performance of such processor and memory intensive algorithms and/or applications may be enhanced.

Where a specific memory space and/or a specific resource are sought, at 406, the hypervisor may determine if the specific memory space and/or the specific resource are available. For example, the hypervisor 229 may translate the specific physical address of the request 220 into a logical address utilizing the page table 277, and determine if the corresponding logical address is available utilizing the table 278. Similarly, the hypervisor 229 may determine if the resource identifier is available utilizing the table 278.

Where the specific memory space and/or the specific resource are available, the hypervisor may deallocate the memory space and/or the resource, at 408, and send an indication to the memory controller that the memory space and/or the resource are available, at 410. For example, the hypervisor 229 of FIG. 2 may deallocate the memory space and/or the resource by modifying the table 278 to reflect the deallocation and/or allocation. For example, the hypervisor 229 may allocate the memory space and/or the resource to the memory controller 214 or to the first resource based upon the request 220. The hypervisor 229 may send an indication to the memory controller 214, and the method may pass to FIG. 3.

Where the specific memory space is not available, the hypervisor may determine whether to wait for the specific memory space and/or the specific resource, at 412. For example, the hypervisor 229 may wait for the specific memory space and/or the specific resource when that the request 220 includes an indication to wait, and the method may pass to 406. Where the hypervisor determines not to wait for the specific memory space and/or the specific resource, the hypervisor may send an indication to the memory controller that the memory space and/or the specific resource is not available based on the determination, at 414. For example, the hypervisor 229 may send an indication to the memory controller 214 that the specific memory space and/or the specific resource is not available, and the method may pass to FIG. 3.

Where the hypervisor determines that the request does not seek a specific memory space and/or a specific resource, the hypervisor may determine if the memory space and/or the resource are available from the hypervisor, at 416. For example, the hypervisor 229 may determine that the request 220 is for a general memory space seeking a quantity and/or a general resource seeking any processor resource. The hypervisor 229 may utilize the table 278 to determine if the quantity and/or a processor resource are available from the hypervisor 229.

Where the general memory space and/or the general resource are available from the hypervisor, the hypervisor may deallocate the memory space and/or the resource, at 408. For example, the hypervisor 229 may deallocate the memory space and/or the resource by modifying the table 278 to reflect the deallocation and/or allocation of the memory space and/or the resource to the memory controller 214 or to the first resource. At 410, the hypervisor may send an indication to the memory controller that the memory space and/or the resource are available based on the determination. For example, the hypervisor 229 may send an indication to the memory controller 214 that the memory space and/or the resource are available, and the method may pass to FIG. 3.

Where the general memory space and/or the general resource are not available from the hypervisor, the hypervisor may determine if the memory space and/or the resource are available from an operating system, at 418. For example, the hypervisor 229 may utilize the table 278 to determine if the quantity and/or a processor resource are available from any one of the operating systems 258, 259, 260. At 420, the hypervisor may send an indication to the memory controller that the memory space and/or the resource are available from the operating system based on the determination. For example, the hypervisor 229 may send an indication to the memory controller 214 that the memory space and/or the resource are available from one of the operating systems 258, 259, 260, and the method may pass to FIG. 3.

Where the general memory space and/or the general resource are not available from the operating system, the hypervisor may determine if the memory space and/or the resource are available from a process, at 422. For example, the hypervisor 229 of FIG. 2 may utilize the table 278 to determine if the quantity and/or a processor resource are available from any one of the processes 279, 280, 281. At 424, the hypervisor may send an indication to the memory controller that the memory space and/or the resource are available from the process based on the determination. For example, the hypervisor 229 may send an indication to the memory controller 214 that the memory space and/or the resource are available from one of the processes 279, 280, 281, and the method may pass to FIG. 3.

Where the general memory space and/or the general resource are not available from the process, the hypervisor may send an indication to the memory controller that the memory space and/or the resource is not available from the process based on the determination. For example, the hypervisor 229 may send an indication to the memory controller 214 that the memory space and/or the resource is not available from the processes 279, 280, 281, and the method may pass to FIG. 3.

Referring back to FIG. 3, turning first to 312, the memory controller may receive the indication (or indications) from FIG. 4 that the memory space and/or the resource are available from the operating system, the process, or any combination thereof. For example, the memory controller 214 may receive the indication from the hypervisor 229 that the memory space and/or the resource are available from one of the operating systems 258, 259, 260, from one of the processes 279, 280, 281, or any combination thereof, especially when the memory space and/or the resource is not available from the hypervisor 229.

At 314, the memory controller may send the request to the operating system, the process, or any combination thereof in response to the indication or indications received. For example, the memory controller 214 may send the request 220 to one of the operating systems 258, 259, 260, one of the processes 279, 280, 281, or any combination thereof in response to the indication received. At 316, the method may pass to FIG. 5 for the operating systems 258, 259, 260 or to FIG. 6 for the processes 279, 280, 281.

Figure 5:
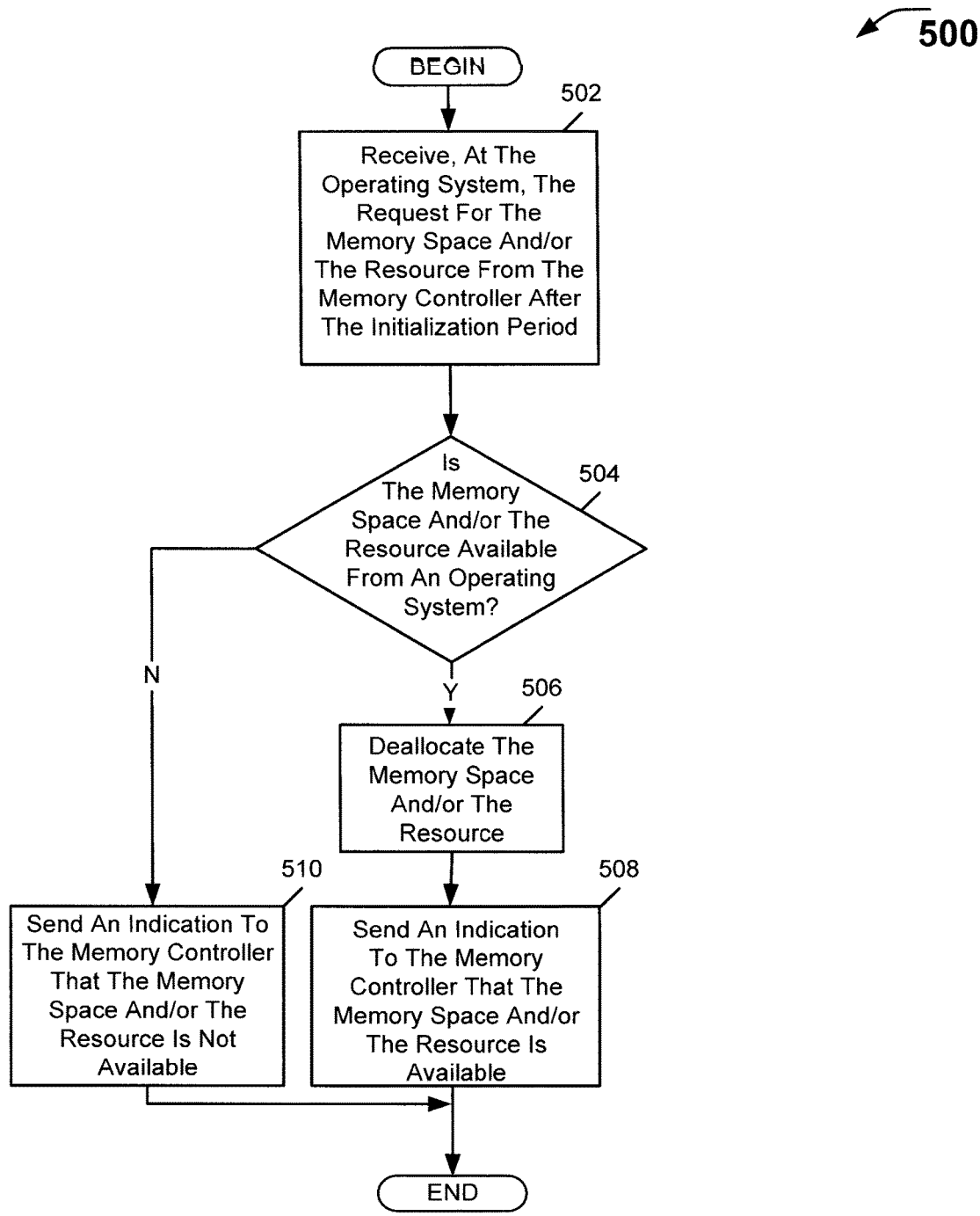
FIG. 5 is a flowchart of an embodiment of a first method of processing a request for a memory space and/or a resource from a memory controller by an operating system that may be executed by the computing systems of FIGS. 1A-2.
Figure 6:
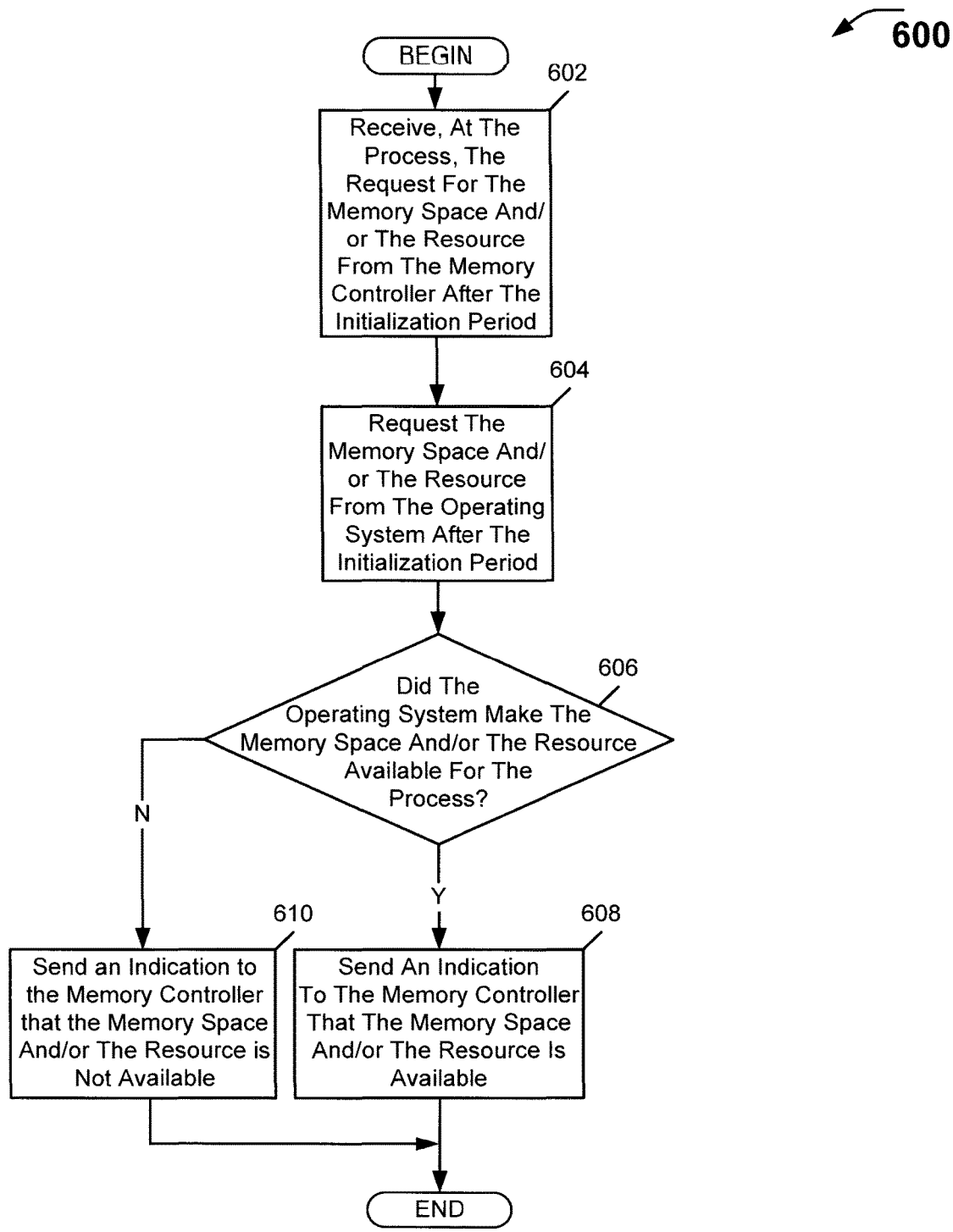
FIG. 6 is a flowchart of an embodiment of a first method of processing a request for a memory space and/or a resource from a memory controller by a process that may be executed by the computing systems of FIGS. 1A-2.
Figure 7:
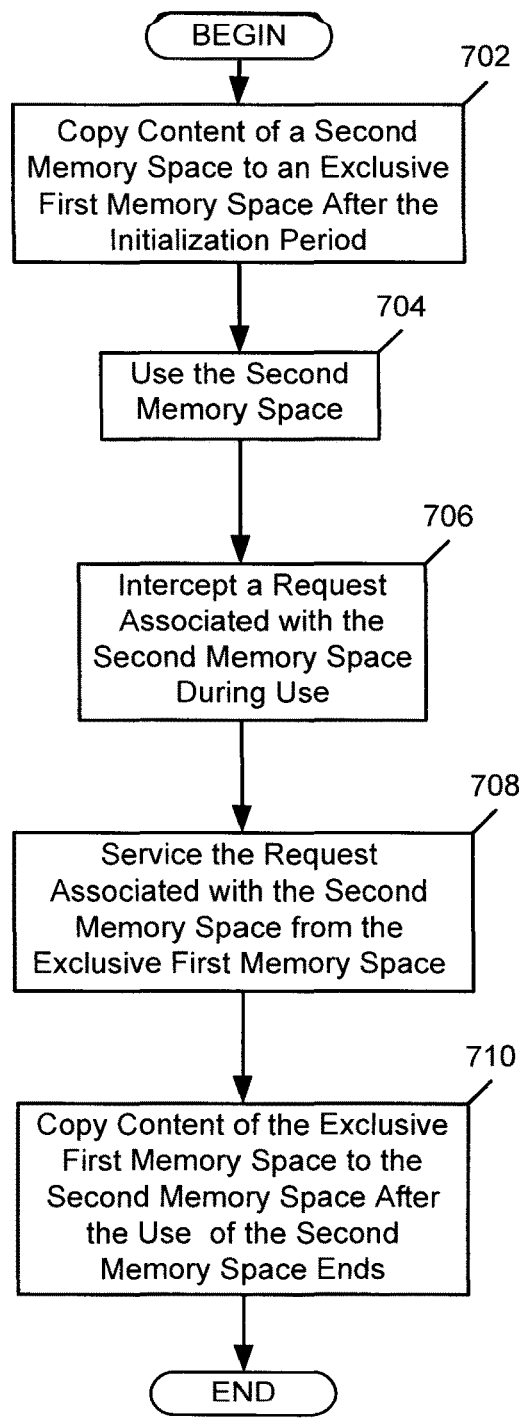
FIG. 7 is a flowchart of an embodiment of a first method of copying a memory space to an exclusive memory space of a memory controller that may be executed by the computing systems of FIGS. 1A-2.

At 318, the memory controller may receive an indication that the memory space is not available from FIG. 5, FIG. 6, or any combination thereof. At 320, the memory controller may utilize FIG. 7 to copy the memory space that is not available into an exclusive memory space of the memory controller and utilize the unavailable memory space. For example, the operating systems 258, 259, 260, the processes 279, 280, 281, or any combination thereof that received the request 220 may send an indication to the memory controller 214 that the memory space is not available, even though the hypervisor 229 indicated that the memory space was available based on its data. For example, even though the hypervisor 229 may determine that a memory space is available from the operating system 260, the operating system 260 may have already allocated that memory space to an application, and the hypervisor 229 may not have received that data before its determination. In response to this indication that the memory space is not available, the memory controller 214 may copy the unavailable memory space from the hypervisor 229, the operating systems 258, 259, 260, the processes 279, 280, 281, or any combination thereof into the exclusive memory space 224 of the memory controller 214 and use the unavailable memory space. From FIG. 7, the method may pass to FIG. 3. FIGS. 5, 6, 7 will be discussed in greater detail hereinbelow.

Alternatively or additionally, when the memory controller receives an indication that the memory space and/or the resource is not available from FIG. 4, FIG. 5, FIG. 6, or any combination thereof, and when the request 220 is from the first resource, the memory controller may communicate an indication to the first resource that the memory space and/or the resource is not available, at 321. For example, the memory controller 214 may send an indication to the first resource that the memory space and/or the resource are not available.

At 322, the memory controller may receive the indication from the hypervisor, the operating system, the process, or any combination thereof that the memory space and/or the resource are available. For example, the memory controller 214 may receive the indication from the hypervisor 229, the operating systems 258, 259, 260, the processes 279, 280, 281, or any combination thereof from FIGS. 4, 5, 6. When the memory space and/or the resource are requested on behalf of the first resource, the memory controller may communicate an indication to the first resource that the memory space and/or the resource are available, at 323. For example, the memory controller 214 may send an indication (e.g., substantially the same indication from 322, a modified indication as compared to 322, or a new indication as compared to 322) to the first resource that the memory space and/or the resource are available. The indication from the memory controller 214 to the first resource may indicate the source of the available memory space and/or the available resource (e.g., that the memory space and/or the available resource are available from the hypervisor 229 as opposed to one of the operating systems 258, 259, 260). The indication may also indicate the physical address or addresses of the memory 212 corresponding to the memory space that is available and/or an identifier of the resource that is available, especially if the request 220 was for a general memory space and/or a general resource. If the request 220 was for a specific memory space and/or a specific resource, then the physical address or addresses corresponding to the memory space that is available and/or the identifier of the resource that is available should match the physical address or addresses and/or identifier sought by the request 220.

For instance, the available memory space and/or the available resource may be illustrated as the DASD memory space 298 and/or the DAS resource 299 if the first resource is the DASD 236. The first resource may receive and react to the indication from the memory controller 214 as illustrated in FIG. 8 (discussed hereinbelow). Next, the method may pass to 302, 306, or 307 as described herein.

When the memory space and/or the resource are requested for the memory controller's own use, the memory controller may register the memory space and/or the resource before use by the memory controller of the memory space and/or the resource, at 324. For example, the memory controller 214 may receive the indication, at 322, from the hypervisor 229, the operating systems 258, 259, 260, the processes 279, 280, 281, or any combination thereof from FIGS. 4, 5, 6, and the available memory space and/or the available resource may be illustrated as the MC memory space 223 and/or the MC resource 231. The indication may indicate the source of the memory space and/or the available resource (e.g., that the memory space and/or the available resource are available from the hypervisor 229 as opposed to one of the operating systems 258, 259, 260). The indication may also indicate the physical address or addresses of the memory 212 corresponding to the memory space that is available and/or an identifier of the resource that is available, especially if the request 220 was for a general memory space and/or a general resource. If the request 220 was for a specific memory space and/or a specific resource, then the physical address or addresses corresponding to the memory space that is available and/or the identifier of the resource that is available should match the physical address or addresses and/or identifier sought by the request 220.

The memory controller 214 may register the memory space and/or the resource at the register 221 before use. Furthermore, or alternatively, the memory controller 214 may register the memory space and/or the resource with the hypervisor 229 for the table 278, such as registering which physical address range of the memory 212 and/or registering which resource has been made available to the memory controller 214 before the memory controller 214 begins to utilize the memory space and/or the resource.

At 326, the memory controller may use the memory space and/or the resource (e.g., after the initialization period). For example, the memory controller 214 may utilize the memory space and/or the resource in a variety of ways, including ways that are not conventionally associated with memory controllers. The memory controller 214 may have exclusive use of the memory space and/or the resource. The memory space and/or the resource may be used for at least one of testing, calibrating, tracing, caching, optimizing, computing, transforming, encrypting, decrypting, prefetching, paging, precoding, predecoding, compressing, decompressing, remapping, mirroring, shadowing, or as a scratch pad. The resource that is requested may be a processor resource to perform these operations (e.g., requesting the processor 210 to perform encrypting, compressing, etc.) and/or the resource that is requested may be an input-output resource to store data for or from these operations (e.g., requesting the DASD 248 for caching, computing (e.g., matrix math), etc.).

For example, the memory controller 214 may use the memory space and/or the resource for testing and/or calibrating, such as for system level tests to assure margins. For example, while the memory controller 214 has control over the memory space and/or the resource, the memory controller 214 may be free to write test patterns into the physical address or addresses corresponding to the memory space and/or the resource, as well as perform modifications to delays and/or analog timings for that memory space and/or that resource, without corrupting data that may be used somewhere else in the computing system 200. The accuracy of pattern tests and interface calibrations, for example, may be improved as more realistic conditions may be utilized.

As another example, the memory controller 214 may request a memory space and/or the resource after the initialization period from the hypervisor 229 and use the memory space and/or resource made available in response to the request 220 for pattern testing and interface calibrating. The memory controller 214 may read and write specific patterns, compare the results, and determine operating margins, statistics, and configurations for optimal calibration in situ. More accurate runtime calibrations may be made as system conditions present after the initialization period in a running system may be different from those system conditions present during the initialization period. For instance, results and tuning achieved during initialization may be different after the initialization period when chips of the system are heated up from usage. Other affects, such as jitters, crosstalk, inter-symbol interference, power supply noise, or any combination thereof may also not be accounted for during the initialization period when the system is relatively quiet. Thus, a memory space and/or the resource available for use by the memory controller 214 after the initialization period in response to the request 220 from the memory controller 214 may improve the accuracy of testing and calibrating as more realistic conditions may be taken into account.

If the usage of the system shifts because of customer activity, this shift may be accounted for as well. For example, if the system was calibrated during a period of heavy and intensive utilization, testing and calibrating may be performed during lower and less intensive utilization to account for the different conditions.

The memory space and/or the resource may be released by the memory controller 214 after the use has completed, and the memory space and/or the resource may be allocated and used by another entity. For example, if the hypervisor 229 provided the memory space and/or the resource, the memory controller 214 may release the memory space and/or the resource by sending an indication to the hypervisor 229 that the memory controller 214 is done. The hypervisor 229 may deallocate the memory space and/or the resource used by the memory controller 214, including modifying the table 278 as appropriate.

As another example, the memory controller 214 may use the memory space and/or the resource for tracing. The memory controller logic 216 may include tracing functionality configured to monitor for certain accesses and may use the memory space and/or the resource to save the results of a trace. For instance, the trace may capture accesses to certain locations of the memory 212. These results may then be used to analyze code behavior for a variety of purposes, such as improving performance, code analysis, debugging, or any combination thereof. The trace functionality may be configured for a specific processor, a physical address location, a range of physical addresses, a type of access, or any combination thereof. The memory space and/or the resource may be released by the memory controller 214 after the use has completed.

The memory controller 214 may use the memory space and/or the resource for caching and/or optimizing, such as optimizing memory accesses by setting up a temporary cache. For example, if the memory controller 214 detects that writes are dispersed throughout the memory 212, and therefore causing multiple logical ranks to remain powered up to service requests, the memory controller 214 may generate the request 220 for the memory space (e.g., block of memory 212) and setup a cache at the memory space and/or the resource. Once the cache is no longer needed, either by a change in access patterns or closed processes, the memory controller 214 may flush its cache entries and release the memory space and/or the resource. This type of caching may reduce the number of disparate accesses by grouping them onto one area. Moreover, this reduction may allow more logical ranks to be idle and/or in a powered down state for longer periods of time, as those ranks may not need to service accesses that are hits in the cache. This batching or grouping of memory accesses may also reduce system power.

The memory controller 214 may use the memory space and/or the resource for computing. Matrix math is generally a computation intensive functionality. However, instead of burdening the processor 208, for example, hardware may be put in the memory controller 214 to perform the computations. In this scenario, the memory controller 214 may be given the data on which the math is to be performed. As the matrix math is performed, intermediate results may be placed into the memory space and/or the resource in order for the calculations to be performed. After the calculations are complete, the results may be presented to the processor 208. The memory space and/or the resource may be released by the memory controller 214 after the use has completed.

The memory controller 214 may utilize the memory space and/or the resource for practically any computation for a processor, either speculatively (e.g., speculative need) or by request of the processor (e.g., an actual need). For example, the memory controller 214 may use the memory space and/or the resource to transform data for use by the processor 208, such as for matrix transposition or other matrix math or image data where the transformations may be done speculatively or by request of the processor 208. With the memory controller 214 performing these computations directly in the memory space and/or the resource, the processor 208 may be relieved of these computationally intensive tasks and may perform other tasks while it awaits results from the memory controller 214. In addition to potentially reducing the burden to the processors 208, 210, memory bandwidth may be better utilized by interleaving accesses with mainline traffic, which may improve or maximize bandwidth usage on the interface of memory 212 (e.g., DRAM interface).

The memory controller 214 may use the memory space and/or the resource for encrypting and/or decrypting. The memory space and/or the resource may be used for encrypting and/or decrypting in a similar manner as computing. For example, the memory space and/or the resource may be utilized to perform the calculations, including directly processing the encryption and/or decryption algorithm on the subject data, and returning the results to the processor 208 once the encrypting and/or decrypting has completed. The memory space and/or the resource may be released by the memory controller 214 after the memory controller 214 has completed its use.

The memory controller 214 may use the memory space and/or the resource for prefetching. For example, the memory controller 214 may prefetch at least one buffer, a cache, etc., prepare data, and associate to another address to opportunistically access in lieu of incurring longer latency to the requested data. The memory controller 214 may prefetch from slower memory in a tired memory hierarchy. Moreover, the memory controller 214 may engage in predecoding, compressing, decompressing, decrypting, or any combination thereof of the data in anticipation of access by the processor 208. The memory space and/or the resource may be released by the memory controller 214 after the use has completed.

The memory controller 214 may use the memory space and/or the resource for remapping. As discussed in connection with FIG. 2, the memory controller 214 may dynamically remap and move contents from one faulty physical location of the memory 212 to a different physical location of the memory 212 that is not faulty. The memory controller 214 may communicate to the hypervisor 229 status or state data during the remapping process as well as the final remapping via the MC memory space 223 and/or the register 222. The hypervisor 229 may manage the computing system 200 with the new configuration, including using the final remapping and refraining from allocating the faulty memory space.

The memory controller 214 may use the memory space and/or the resource for mirroring. For example, the memory controller 214 may logically mirror another memory space in the memory space and/or the resource available for use by the memory controller 214. As such, two memory spaces may have substantially the same content without using multiple memory controllers and without using different DIMMs. A mirror may be created in a less expensive manner with fewer parts. The memory space and/or the resource may be released by the memory controller 214 after the use has completed.

The memory controller 214 may use the memory space and/or the resource for shadowing. For example, the memory controller 214 may maintain a copy of another memory space in the memory space and/or the resource available for use by the memory controller 214. However, the copy may not need to be the same, instead, for example, if the other memory space was compressed, the copy maintained by the memory controller 214 may be uncompressed. Some attributes, patterns, etc. may be shadowed but not others. In some embodiments, mirroring and shadowing may be used in combination. The memory space and/or the resource may be released by the memory controller 214 after the use has completed.

The memory controller 214 may use the memory space and/or the resource for at least one of upstream data processing or upstream data storage. For example, the memory controller 214 may request a memory space Y1 and an input-output resource Z1 for exclusive use, as well as designate the memory space Y1 as a dedicated memory region for upstream data processing and upstream data storage. Upstream data may refer to data from a network (e.g., via the network controller 122 of FIGS. 1A-1C). The memory controller 214 may interlock with the input-output resource Z1 to perform a desired operation (e.g., encryption, compression, etc.) to be applied on the upstream data before storage. As such, for example, the memory controller 214 may be given a job (e.g., a job triggered by an event, by a processor, by a hypervisor, etc.), and the memory controller 214 can use the resources made available to process the data directly to accomplish the job.

The memory controller 214 may use the memory space and/or the resource for at least one of downstream data processing or downstream data storage. For example, the memory controller 214 may request a memory space Y2 and input-output resource Z2 for exclusive use, as well as designate the memory space Y2 as a dedicated memory region for downstream data processing and downstream data storage. Downstream data may refer to data to a network. The memory controller 214 may interlock with the input-output resource Z2 to perform a desired operation (e.g., decryption, decompression, etc.) to be applied on the downstream data, when read from a storage area.

Alternatively, or additionally, the memory controller 214 may request a memory space Y3 and a processor resource Z3 for exclusive use, as well as designate the memory space Y3 as a dedicated memory region as appropriate. The memory controller 214 may interlock with the processor resource Z3 to perform any desired operation (e.g., decryption, decompression, etc.) or functionality supported by the memory controller 214.

The uses of the memory space and/or the resource by the memory controller 214 (e.g., after the initialization period) are not limited to those described herein. For example, the memory space and/or the resource may be utilized for paging (e.g., paging out to a disk drive by the memory controller 214), as a "scratch pad" by the memory controller 214, as appropriate, for precoding, etc.

Referring back to FIG. 3, at 328, the memory controller may determine whether an indication that the memory space and/or the resource is not available for use has been received. Although the memory controller may be able to use the memory space and/or the resource without conflict, the processes 279, 280, 281, the operating systems 258, 259, 260, or any combination thereof may lose control of the memory space and/or the resource that it has made available for use by the memory controller 214 or may otherwise no longer be in a position to grant the memory space and/or the resource to the memory controller 214. This may occur when a granting process, operating system (or driver thereof), or any combination thereof is terminated.

To account for these possibilities, the hypervisor 229 may interrogate registers, such as the register 221, in the memory controller 214, that indicate the physical address or addresses of allocated memory spaces and/or identifiers or other data of allocated resources. Based on the register 221, the hypervisor 229 may determine which memory space and/or which resource was allocated to the memory controller 214, and inform the memory controller 214 if the memory controller 214 no longer has control over that memory space and/or that resource via an indication at 328. Additionally, or alternatively, the memory controller 214 may register the physical address or addresses corresponding to the memory space and/or identifier of the resource that it has been allocated before use of the memory space and/or the resource directly with the hypervisor 229. The intervention by the hypervisor 229 may occur when the hypervisor 229 allocated the memory space and/or the resource to the memory controller 214. The intervention by the hypervisor 229 may also occur when the memory space and/or the resource is made available for use by one of the operating systems 258, 259, 260 and that operating system has been terminated, as the hypervisor 229 may be responsible for the partitions that include the operating systems 258, 259, 260.

A similar methodology may be used at the operating system level when user-level processes, drivers, or any combination thereof are terminated. For example, the operating systems 258, 259, 260 may react to termination of the OS drivers 285, 286, 287, the processes 279, 280, 281, or any combination thereof by determining which memory space and/or which resource was allocated to the memory controller 214, and informing the memory controller 214 if the memory controller 214 no longer has control over the memory space and/or the resource via the indication at 328.

Where the indication is received at 328, the memory controller may stop the use of the memory space and/or the resource at 330 and release the memory space and/or the resource at 332. For example, the memory controller 214 may stop use of the memory space and/or the resource in response to an indication from the hypervisor 229, any of the operating systems 258, 259, 260, or any combination thereof. The method may pass to 302, 306, or 307 as described herein.

Where the indication is not received at 328, the memory controller may continue to use the memory space and/or the resource at 334 and release the memory space at 332 after the use has completed. For example, the memory controller 214 may continue to use the memory space and/or the resource, and release the memory space and/or the resource after the use has completed. The method may pass to 302 or 306 as described herein.

Turning to FIG. 5, this drawing illustrates an embodiment of a first method 500 of processing a request for a memory space and/or a resource (e.g., from a memory controller for its own use or on behalf of the first resource) (e.g., that is communicated after an initialization period) by an operating system, which may be executed by the apparatus 100 of FIGS. 1A-1C and/or the computing system 200 of FIG. 2. In particular, the method 500 may be executed by the operating system 132 of FIGS. 1A-1C and/or the operating systems 258, 259, 260 of FIG. 2. The method 500 will reference items from FIG. 2.

At 502, the operating system (e.g., discussed in connection with FIG. 3) may receive the request for the memory space and/or the resource from the memory controller after the initialization period. For example, any of the operating systems 258, 259, 260 may receive the request 220 from the memory controller 214.

At 504, the operating system may determine if the memory space and/or the resource are available from the operating system. For example, assuming the operating system 258 received the request 220 from the memory controller 214, the operating system 258 may utilize its corresponding table 294 to determine if the memory space and/or the resource are available from the operating system 258.

Where the memory space and/or the resource are available, the operating system may deallocate the memory space and/or the resource, at 506. For example, the operating system 258 may deallocate the memory space and/or the resource, including modifying the table 294 to reflect the deallocation and/or allocation of the memory space and/or the resource to the memory controller 214 or the first resource. For example, the operating system 258 may allocate the memory space and/or the resource to the memory controller 214 or to the first resource based upon the request 220. At 508, the operating system may send an indication to the memory controller that the memory space and/or the resource are available. For example, the operating system 258 may send an indication to the memory controller 214 that the memory space and/or the resource are available, and the method may pass to FIG. 3 as described herein. Where the memory space and/or the resource are not available, the operating system may send an indication to the memory controller that the memory space and/or the resource is not available, at 510. For example, the operating system 258 may send an indication to the memory controller 214 that the memory space and/or the resource are not available, and the method may pass to FIG. 3 as described herein.

Turning to FIG. 6, this drawing illustrates an embodiment of a first method 600 of processing a request for a memory space and/or a resource (e.g., from a memory controller for its own use or on behalf of the first resource) (e.g., that is communicated after an initialization period) by a process, which may be executed by the apparatus 100 of FIGS. 1A-1C and/or the computing system 200 of FIG. 2. In particular, the method 600 may be executed by the process 150 of FIGS. 1A-1C and/or the processes 279, 280, 281 of FIG. 2. The method 600 will reference items from FIG. 2.

At 602, the process (e.g., discussed in connection with FIG. 3) may receive the request for the memory space and/or the resource from the memory controller after the initialization period. For example, any of the processes 279, 280, 281 of FIG. 2 may receive the request 220 from the memory controller 214 that was generated by the memory controller 214 or the tool 226 or the first resource.

At 604, the process may request the memory space and/or the resource from an operating system. For example, assuming the process 279 received the request 220 from the memory controller 214, the process 279 may request the memory space and/or the resource from the corresponding operating system 258. The operating system 258 may utilize its corresponding table 294 to deallocate and/or allocate the memory space and/or the resource to the process 279. The memory space and/or the resource made available to the process 279 may be illustrated as the process memory space 282 and/or the process resource 241. Alternatively, the process 279 may already have a memory space and/or a resource allocated to it.

At 606, the process may determine if the memory space and/or the resource was made available from the operating system. For example, the process 279 may determine if the operating system 258 made the memory space and/or the resource available for the process 279 based on an indication from the operating system 258 or based on the table 294.

Where the memory space and/or the resource are available, at 608, the process may send an indication to the memory controller that the memory space and/or the resource are available. For example, the process 279 may send an indication to the memory controller 214 that the space and/or the resource are available, and the method may pass to FIG. 3 as described herein. Where the memory space and/or the resource is not available, at 610, the process may send an indication to the memory controller that the memory space and/or the resource is not available. For example, the process 279 may send an indication to the memory controller 214 that the memory space and/or the resource is not available, and the method may pass to FIG. 3 as described herein.

FIG. 7 illustrates an embodiment of a first method 700 of copying a memory space to an exclusive memory space of a memory controller (e.g., after an initialization period) that may be executed by the apparatus 100 of FIGS. 1A-1C and/or the computing system 200 of FIG. 2. In particular, the method 700 may be executed by a memory controller such as the memory controller 114 of FIGS. 1A-1C and/or the memory controller 214 of FIG. 2. The memory space may be copied to an exclusive memory space of the memory controller after an initialization period. The method 700 will reference items from FIG. 2.

At 702, the memory controller (e.g., discussed in connection with FIG. 3) may copy content of a second memory space to an exclusive first memory space after the initialization period. For example, the memory controller 214 may copy the contents of practically any portion of the memory 212 (e.g., the second memory space) to its exclusive memory space 224 (e.g., the exclusive first memory space) after the initialization period. For instance, the memory controller 214 may copy the contents of an address range X of the memory 212 that the memory controller 214 requested via the request 220 from the hypervisor 229, the operating systems 258, 259, 260, the processes 279, 280, 281, or any combination thereof that was not available according to a received indication. Alternatively, after the initialization period, the memory controller 214 may simply copy the contents of the address range X regardless of whether the memory controller 214 requested this memory space, regardless of whether the memory space is available based on a received indication, regardless of which entity the memory space is allocated to, etc. into the exclusive memory space 224. As such, the exclusive memory space 224 may be utilized for shadowing. The exclusive memory space 224 may be utilized for at least one of testing, calibrating, tracing, caching, optimizing, computing, transforming, encrypting, decrypting, prefetching, paging, precoding, predecoding, compressing, decompressing, remapping, mirroring, or shadowing, or as a scratch pad. The use of the exclusive memory space 224 by the memory controller 214 may depend on the size of the exclusive memory space 224. The memory controller 214 may use the exclusive memory space 224 for other uses as well.

At 704, the memory controller may use the second memory space. For example, the memory controller 214 may use the address range X of the memory 212 for at least one of testing, calibrating, tracing, caching, optimizing, computing, transforming, encrypting, decrypting, prefetching, paging, precoding, predecoding, compressing, decompressing, remapping, mirroring, shadowing, or as a scratch pad. The memory controller 214 may use the address range X for other uses as well.

At 706, the memory controller may intercept a request associated with the second memory space during the memory controller's use of the second memory space. For example, the memory controller 214 may intercept at least one request (e.g., all requests) to access, to read, to write, or any combination thereof the address range X of the memory 212 during the use of the address range X of the memory 212.

At 708, the memory controller may service the request associated with the second memory space during the memory controller's use of the second memory space from the exclusive first memory space. For example, the memory controller 214 may service the intercepted request during the use of the address range X of the memory 212 from the exclusive memory space 224. Specifically, the request may be serviced from the contents copied from the address range X to the exclusive memory space 224.

At 710, the memory controller may copy content of the exclusive memory space to the second memory space after the use of the second memory space has completed. For example, the memory controller 214 may copy the content of the address range X of the memory 212 from the exclusive memory space 224 back to the address range X after the use of the address range X has completed. As such, the second memory space corresponding to the address range X may be used by the memory controller 214 after the initialization period and contents may be restored to a pre-use state. The method may pass to FIG. 3 as described herein.

By augmenting memory controller hardware with a small area of memory, such as eDRAM, this memory (e.g., the exclusive memory space 224) may be in the memory controller logic and always under its exclusive control. The memory controller (e.g., the memory controller 214) may use this block of memory (e.g., after the initialization period) to shadow a section of main memory (e.g., the memory 212) or for other uses. Once the memory controller shadows a block of main memory into its own exclusive memory, the corresponding contents of that main memory may no longer be required to be maintained because all accesses to that block of main memory may be serviced by the memory controller's own exclusive memory. Moreover, the memory controller may perform data-destructive tests and calibrations on the shadowed area of main memory without fear or corruption of system data. Once the desired actions have been performed, the shadow copy of the data may be returned to its prior location in main memory and the exclusive memory space of the memory controller is free to be used to shadow another location of main memory.

FIG. 8 illustrates an embodiment of a first method of requesting a memory space and/or a resource by a first resource (e.g., a processor resource and/or an input-output resource, after an initialization period) using a memory controller that may be executed by the apparatus 100 of FIGS. 1A-1C and/or the computing system 200 of FIG. 2. The method 800 may be executed by a first resource, such as the processor 120 of FIGS. 1A-1C, the network controller 122 of FIGS. 1A-1C, the I/O controller 124 of FIGS. 1A-1C, the processor 210 of FIG. 2, the DASD 236 of FIG. 2, etc. The method 800 references components from FIG. 2.

At 802, the first resource may detect an event after an initialization period. The first resource may generate a request for a memory space and/or a resource in response to an event, at 804. For example, the DASD 236 may be configured to detect the event 228 and generate the request 220 in response to the event 228. The first resource may generate the request 220 for a memory space and/or resource for other reasons as well.

At 806, the first resource may communicate the request to a memory controller. For example, the DASD 236 may communicate the request 220 to the memory controller 214 via the bus. The request 220 may be received by the memory controller 214 and processed as described in FIGS. 3, 4, 5, 6.

At 808, the first resource may receive an indication that the memory space and/or the resource is not available. For example, the DASD 236 may receive an indication from the memory controller 214 that the memory space and/or the resource is not available responsive to the processing of FIGS. 3, 4, 5, 6. The method may pass to 802 as described herein.

Alternatively, at 810, the first resource may receive an indication that the memory space and/or the resource are available. For example, the DASD 236 may receive an indication from the memory controller 214 that the memory space and/or the resource are available responsive to the processing of FIGS. 3, 4, 5, 6. The indication that the memory space and/or the resource are available may be received from a computer program, such as the computer program that made the memory space and/or resource available.

At 812, the first resource may register the memory space and/or the resource before use by the first resource of the memory space and/or the resource. For example, the DASD 236 may cause the memory space and/or the resource to be registered in a register similar to 221 or other storage area before use. Furthermore, or alternatively, the DASD 236 may register the memory space and/or the resource with the hypervisor 229 for the table 278, such as registering which physical address range of the memory 212 and/or registering which resource identifier has been made available to the DASD 236 before use. Alternatively, or additionally, the memory controller 214 may even register the memory space and/or the resource available to the DASD 236 in the register 221.

At 814, the first resource may use the memory space and/or the resource (e.g., after the initialization period). For example, the first resource may utilize the memory space and/or the resource in a variety of ways, including ways that are not conventionally associated with the first resource. The first resource may have exclusive use of the memory space and/or the resource (e.g., the second resource). The memory space and/or the resource may be used by the first resource for at least one of testing, calibrating, tracing, caching, optimizing, computing, transforming, encrypting, decrypting, prefetching, paging, precoding, predecoding, compressing, decompressing, remapping, mirroring, shadowing, or as a scratch pad. The DASD 236 may request a processor resource to perform these operations (e.g., requesting the processor 210 to perform the encrypting, compressing, etc.) and/or an input-output resource or memory space to store data for or from these operations (e.g., requesting the DASD 248 or other memory space for caching, computing (e.g., matrix math), etc.). The first resource may use the memory space and/or the resource as discussed hereinabove in connection with 326 of FIG. 3

Moreover, the first resource may use the memory space and/or the resource for at least one of upstream data processing or upstream data storage. The first resource may use the memory space and/or the resource for at least one of downstream data processing or downstream data storage. Alternatively, or additionally, the first resource may request a memory space and/or resource for exclusive use, as well as designate the memory space as a dedicated memory region as appropriate. The first resource may also interlock with the resource to perform any desired operation (e.g., decryption, decompression, etc.) or functionality (e.g., including operations supported by the memory controller 214). The uses of the memory space and/or the resource by the first resource (e.g., after the initialization period) are not limited to those described herein. For example, the memory space and/or the resource may be utilized for paging, as a "scratch pad," for precoding, etc. For example, the DASD 236 may use the memory space and/or the resource as discussed hereinabove in connection with 326 of FIG. 3.

Referring back to FIG. 8, at 816, the first resource may determine whether an indication that the memory space and/or the resource is not available for use has been received. For example, if the hypervisor is no longer in a position to make the memory space and/or the resource available to the DASD 236, the hypervisor 229 may send an indication to the DASD 236. Alternatively, the indication may be communicated by the hypervisor 229 to the memory controller 214, and the memory controller 214 communicates the indication to DASD 236.

Where the indication is received at 816, the first resource may stop the use of the memory space and/or the resource at 818 and release the memory space and/or the resource at 820. For example, the DASD 236 may stop use of the memory space and/or the resource in response to an indication from the hypervisor 229, any of the operating systems 258, 259, 260, the processes 279, 280, 281, the memory controller 214, or any combination thereof. The method may pass to 802 as described herein.

Where the indication is not received at 816, the first resource may continue to use the memory space and/or the resource at 822 and release the memory space and/or the resource at 820 after the use has completed. For example, the DASD 236 may continue to use the memory space and/or the resource, and release the memory space and/or the resource after the use has completed. The method may pass to 802 as described herein.

A memory controller may cross boundaries into a hypervisor's memory space, a hypervisor's resources, an operating system's (or driver's) memory space, an operating system's (or driver's) resources, a process's memory space, a process's resources, or any combination thereof. Once these boundaries have been crossed, and the hardware logic of the memory controller has access and control of the memory space and/or the resource, the memory controller may engage in functionality with the memory space and/or the resource that is conventionally not associated with the memory controller.

The memory controller may be provided a request path back to the hypervisor, operating system, process, or any combination thereof for sections of memory and/or resources. As described hereinabove, the request may be generated by the memory controller and may be granted by the hypervisor, the operating system, process, or any combination thereof. Free memory space or pages and/or resources may be allocated for use by the memory controller without conflicts with system data or processes. The memory space or pages may be pinned and mapped virtual to physical to facilitate the memory controller directing the allocation to a physical memory region. The memory controller may request pages and/or resources for temporary use (or even persistent use) with return to the system when no longer needed. Memory controller capability to gain permanent or temporary shared or exclusive control to regions of memory and/or resources during the system operation, and granted by the system software, may expand the role of the memory controller for system efficiency and reliability. Moreover, the memory controller may also copy a memory space into its own exclusive memory space and use the memory space as desired.

Furthermore, the memory controller may be used by a first resource, such as an input-output resource or a processor resource, to request a memory space and/or resource. The first resource may generate the request for the memory space and/or resource, and the memory controller may communicate with any of the hypervisor, operating systems, or processes to satisfy the request from the first resource. The memory controller may request a memory space and/or a resource for its own use or on behalf of the first resource, further expanding the role of the memory controller. Even more free memory space or pages and/or resources may be allocated and used by the first resource without conflicts with system data or processes, which may further improve utilization and efficiency in the system.

Various modifications may be made to the embodiments disclosed herein. For example, in a certain embodiment, the memory controller may request a memory space and/or a resource from only a hypervisor, and not from an operating system and not from a process. For example, the method 300 of FIG. 3 may be modified to remove 312, 314, 316, and 318, the method 400 may be modified to remove 418, 420, 422, 424, FIGS. 5-6 may be removed, and FIG. 2 may be modified accordingly. In a certain embodiment, the memory controller may request a memory space and/or a resource from a hypervisor and/or an operating system, but not from a process. Also, an OS driver may have an option to use its memory space (e.g., OS memory space) and/or its resource, or spawn a process to fill the request. In a certain embodiment, a different order than that disclosed herein may be utilized. For example, a request for a memory space and/or a resource may be sent to an operating system or a process first, instead of to the hypervisor. Furthermore, the request for the memory space and/or the resource does not need to be sent to all three levels. Moreover, as indicated hereinabove, a certain embodiment may not even include a hypervisor. Instead, the memory controller may simply interact via a memory controller device driver with a computer program configured to make a memory space and/or a resource available for use (e.g., an operating system).

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. For example, while some of the above described embodiments may pertain to hardware interrupts, another embodiment of an interrupt may include "if then" or "branch conditional" software instructions that are based on the amount of physical memory available. Such conditional software interrupts may function similarly to a hardware interrupt in that execution may be stopped on the current process, and the memory handling code may begin to execute. A hardware interrupt may be asynchronous to the code operation and may come in at any point in the code, while a program implementation may have to specifically check the available memory using software code instructions. Thus, the present disclosure is not intended to be limited to the embodiments shown herein but is to be accorded the widest scope possible consistent with the principles and features as defined by the following claims.

The invention claimed is:

1. A method of requesting a resource using a memory controller circuit, the method comprising:
   initializing, by the memory controller circuit, a memory communicatively coupled to a processor via the memory controller circuit, wherein the memory controller circuit is separate from the processor;
   after initializing the memory, detecting, by the memory controller circuit, an event, wherein the event wakes up the memory controller circuit to send an interrupt request for allocation of the resource to a computer program;
   responsive to detecting the event by the memory controller circuit, generating the interrupt request, by the memory controller circuit, as a signal for the allocation of the resource, wherein the allocation of the resource by the computer program provides exclusive use of the resource for the memory controller circuit in performing an action;
   sending the interrupt request, through communication from the memory controller circuit to the computer program, wherein the communication assigns control of allocation of the resource from the memory controller circuit to the computer program;
   based on the assigned control of the allocation, determining, by the computer program, if the interrupt request seeks the exclusive use of the resource;
   responsive to determining the interrupt request seeks the exclusive use, further determining, by the computer program, whether the resource is available or unavailable at a next instance in time;
   responsive to determining that the resource is available:
      deallocating the resource, by the computer program, wherein the deallocating step includes modifying a page table to reflect the available resource;
      after modifying the page table, sending an indication to the memory controller circuit that the resource is available, wherein the indication is sent by the computer program;
      registering, by the memory controller circuit, the available resource in response to the indication; and
      performing, by the memory controller circuit, the action based on the exclusive use of the available resource; and
   responsive to determining the resource is unavailable:
      copying the unavailable resource into an exclusive memory space of the memory controller circuit;
      subsequent to the copying, registering, by the memory controller circuit, the unavailable resource; and
      performing, by the memory controller circuit, the action based on the exclusive use of the unavailable resource.

2. The method of claim 1, wherein the resource comprises an input-output resource, and further comprising receiving, at the memory controller circuit, the indication from the computer program indicating that the memory controller circuit is allocated exclusive access to the input-output resource.

3. The method of claim 1, wherein the computer program comprises at least one of a hypervisor, an operating system, or a Basic Input Output System (BIOS).

4. The method of claim 1, wherein the interrupt request is sent from the memory controller circuit to the computer program via a device driver, and further comprising, after initializing the memory:
   receiving, at the memory controller circuit from the computer program, a read instruction to perform a read operation at the memory;
   responsive to the read instruction, performing, by the memory controller circuit, the read operation at the memory; and
   performing, by the memory controller circuit, an error detection operation on data read based on the read operation.

5. The method of claim 1, wherein performing the action with the resource and the memory controller circuit includes using the resource, by the memory controller circuit, for at least one of downstream data processing, downstream data storage, upstream data processing, or upstream data storage.

6. The method of claim 1, wherein the resource comprises a specific portion of the memory specified in the interrupt request.

7. The method of claim 1, wherein the event comprises a timer expiration event, a maintenance event, a repair event, a memory debug event, a memory analysis event, an error event, or a combination thereof.

8. The method of claim 1, wherein the memory controller circuit does not control allocation of the memory after initializing the memory.

9. The method of claim 1, wherein the memory controller circuit is signaled to check for the event via an interrupt transmitted from the computer program via a direct hardware connection.

10. The method of claim 1, wherein the interrupt request further queries the computer program to allocate an exclusive memory space in the memory in which the action is to be performed, wherein the resource and the memory controller circuit perform the action using the exclusive memory space.

11. The method of claim 1, wherein allocation of the resource reserves the resource for use in performing the action until the resource is de-allocated.

12. A method of requesting at least one of a memory space or a resource using a memory controller circuit, the method comprising:
   initializing, by the memory controller circuit, a memory communicatively coupled to a processor via the memory controller circuit, wherein the memory controller circuit is separate from the processor;

after initializing the memory, detecting, by the memory controller circuit, an event, wherein the event wakes up the memory controller circuit to send an interrupt request for allocation of the memory space or the resource to a hypervisor;

responsive to detecting the event by the memory controller circuit, communicating, by a first resource, the interrupt request as a signal to the hypervisor for the allocation of at least one of a memory space of the memory and the resource via the memory controller circuit for exclusive use to perform an action, wherein the resource is a second resource;

sending the interrupt request, through communication from the memory controller circuit to the hypervisor, wherein the communication assigns control of allocation of the second resource from the memory controller circuit to the hypervisor;

based on the assigned control of the allocation, determining, by the hypervisor, if the interrupt request seeks the exclusive use of the second resource;

responsive to determining the interrupt request seeks the exclusive use, further determining, by the hypervisor, whether the second resource is available or unavailable at a next instance in time;

responsive to determining that the second resource is available:
  deallocating the second resource, by the hypervisor, wherein the deallocating step includes modifying a page table to reflect the available second resource;
  after modifying the page table, sending an indication to the memory controller circuit that the second resource is available, wherein the indication is sent by the hypervisor;
  registering, by the memory controller circuit, the available second resource in response to the indication; and
  performing, by the memory controller circuit, the action based on the exclusive use of the available second resource; and responsive to determining the second resource is unavailable:
  copying the unavailable second resource into an exclusive memory space of the memory controller circuit;
  subsequent to the copying, registering, by the memory controller circuit, the unavailable second resource; and
  performing, by the memory controller circuit, the action based on the exclusive use of the unavailable second resource.

13. The method of claim 12, wherein the first resource comprises at least one of a processor resource or an input-output resource.

14. The method of claim 12, wherein the second resource comprises at least one of a processor resource or an input-output resource.

15. The method of claim 12, wherein the first resource receives the indication from the hypervisor via the memory controller circuit.

16. The method of claim 12, further comprising using the at least one of the memory space or the second resource, by the first resource, for at least one of upstream data processing or upstream data storage.

17. The method of claim 12, further comprising using the at least one of the memory space or the second resource, by the first resource, for at least one of downstream data processing or downstream data storage.

18. The method of claim 12, wherein the memory space comprises a portion of the memory, and wherein the first resource communicates the interrupt request to the hypervisor after initialization of the memory by the memory controller circuit.

19. A method of requesting at least one of a memory space or a resource using a memory controller circuit, the method comprising:

initializing, by the memory controller circuit, a memory communicatively coupled to a processor via the memory controller circuit, wherein the memory controller circuit is separate from the processor;

after initializing the memory, detecting, by the memory controller circuit, an event, wherein the event wakes up the memory controller circuit to send an interrupt request for allocation of the resource to a computer program;

responsive to detecting the event by the memory controller circuit, receiving, by the memory controller circuit, the interrupt request from a first resource for exclusive access to at least one of a memory space of the memory or the resource to be allocated by the computer program to the first resource to perform an action, wherein the resource is a second resource;

communicating, by the memory controller circuit, the interrupt request from the first resource to the computer program, wherein the communication assigns control of allocation of the resource from the memory controller circuit to the computer program;

based on the assigned control of the allocation, determining, by the computer program, if the interrupt request seeks the exclusive use of the second resource, responsive to determining the interrupt request seeks the exclusive use, further determining, by the computer program, whether the second resource is available or unavailable at a next instance in time;

responsive to determining that the second resource is available:
  deallocating the second resource, by the computer program, wherein the deallocating step includes modifying a page table to reflect the available second resource;
  after modifying the page table, sending an indication to the memory controller circuit that the second resource is available, wherein the indication is sent by the computer program;
  registering, by the memory controller circuit, the available second resource in response to the indication; and
  performing, by the memory controller circuit, the action based on the exclusive use of the available second resource; and
responsive to determining the second resource is unavailable:
  copying the unavailable second resource into an exclusive memory space of the memory controller circuit;
  subsequent to the copying, registering, by the memory controller circuit, the unavailable second resource; and
  performing, by the memory controller circuit, the action based on the exclusive use of the unavailable second resource.

* * * * *